J. N. THORNTON.
COMBINED TYPE WRITING AND COMPUTING MACHINE.
APPLICATION FILED MAY 22, 1913.
1,283,360.
Patented Oct. 29, 1918.
10 SHEETS—SHEET 2.
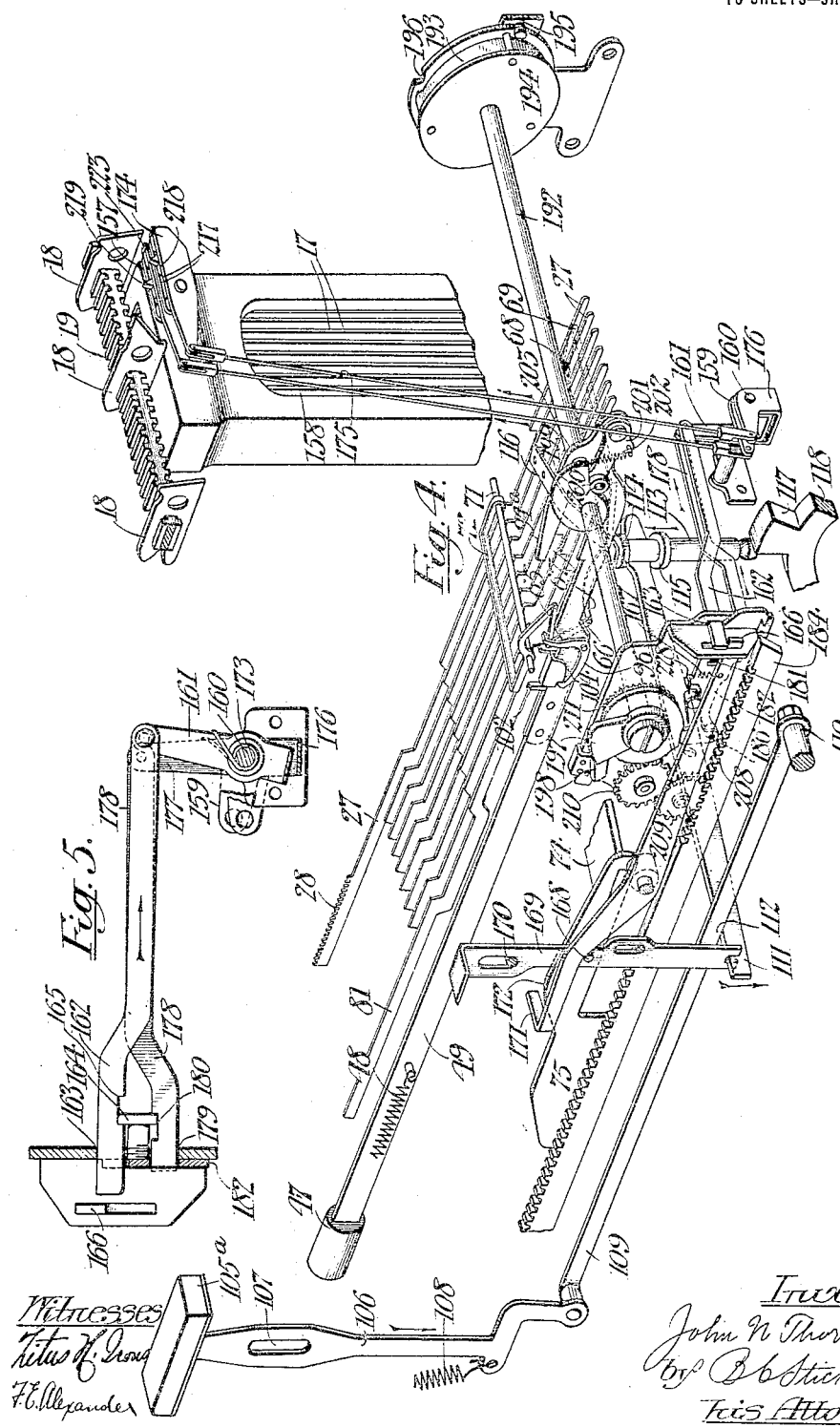

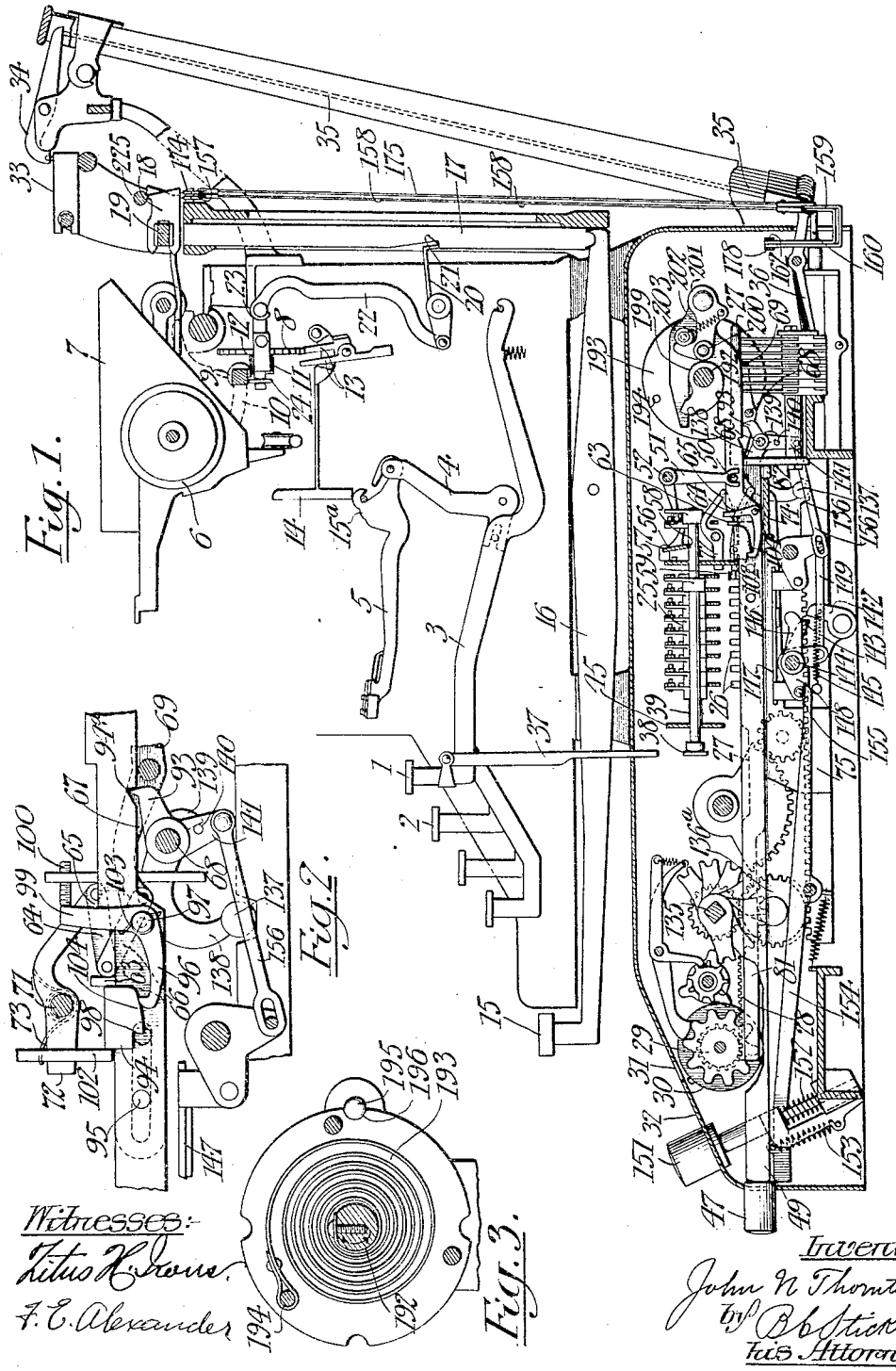

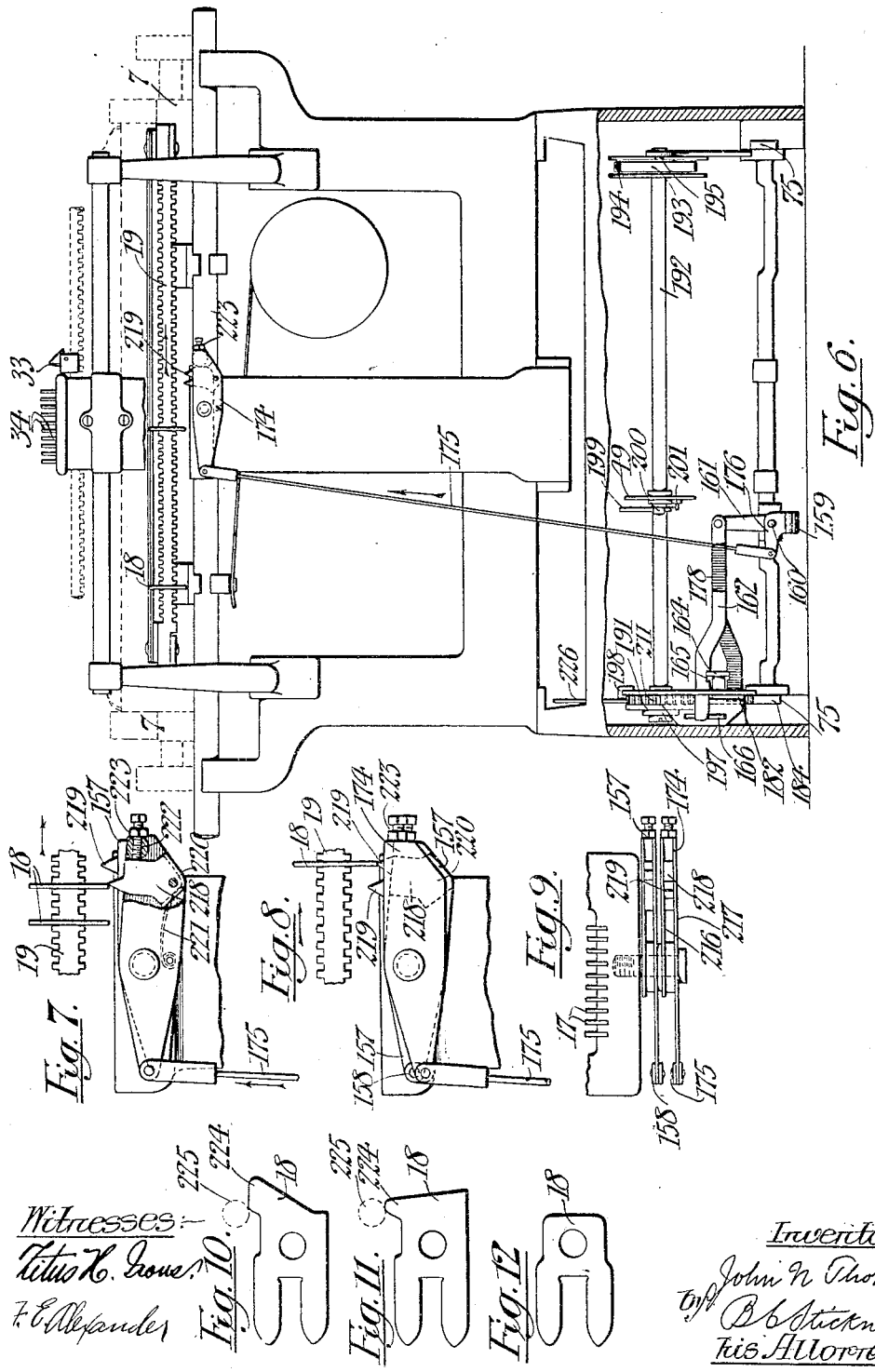

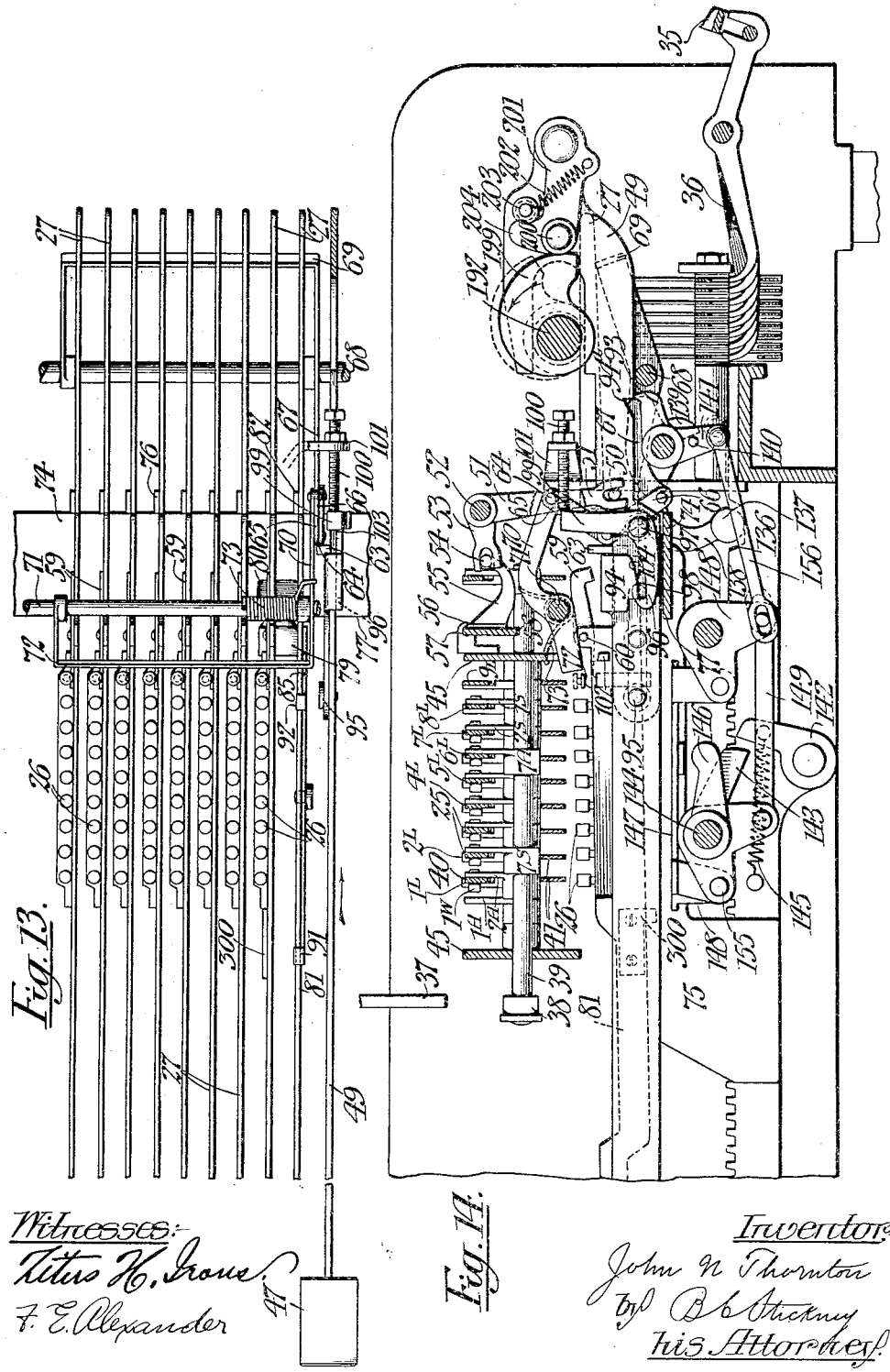

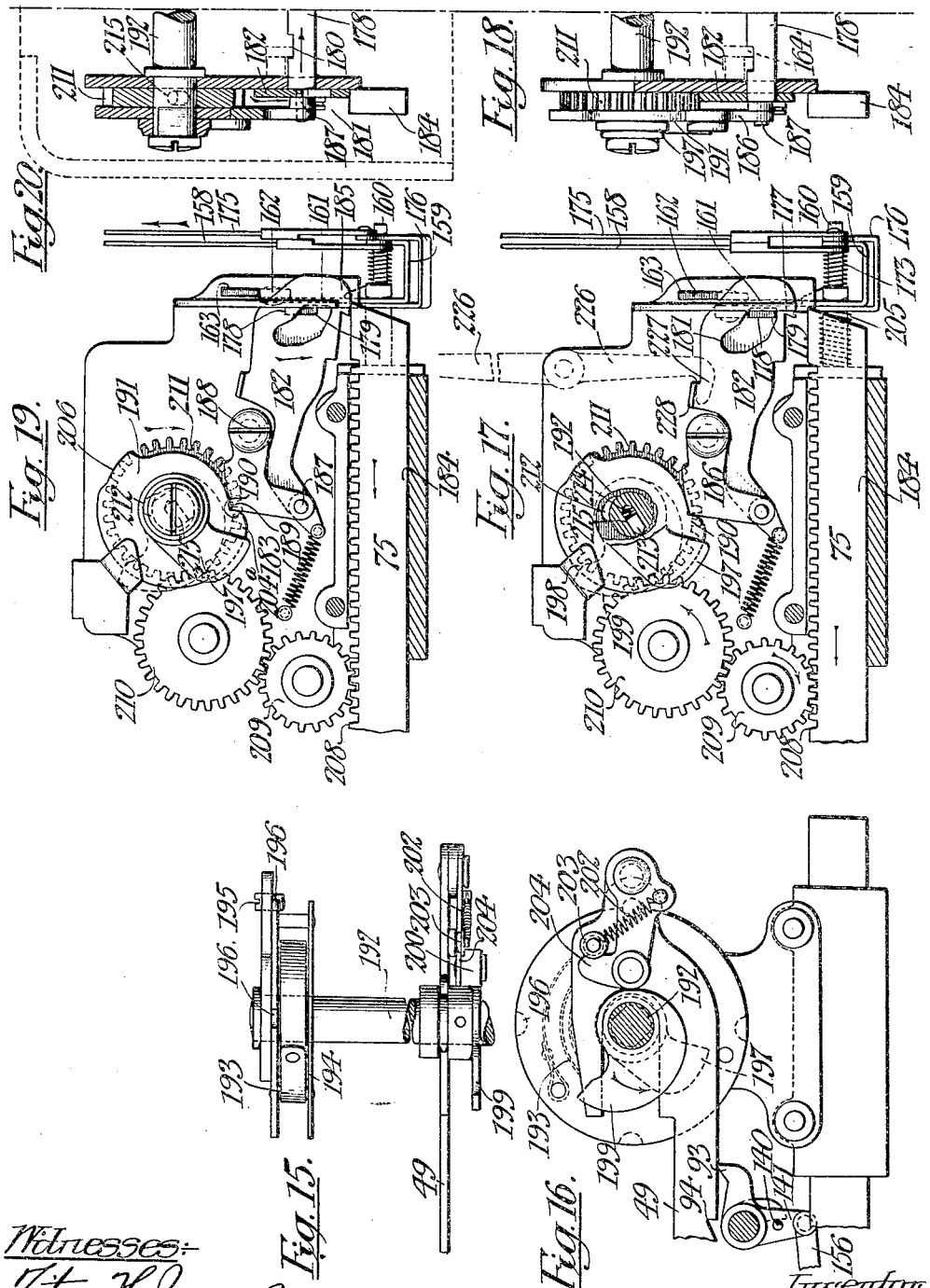

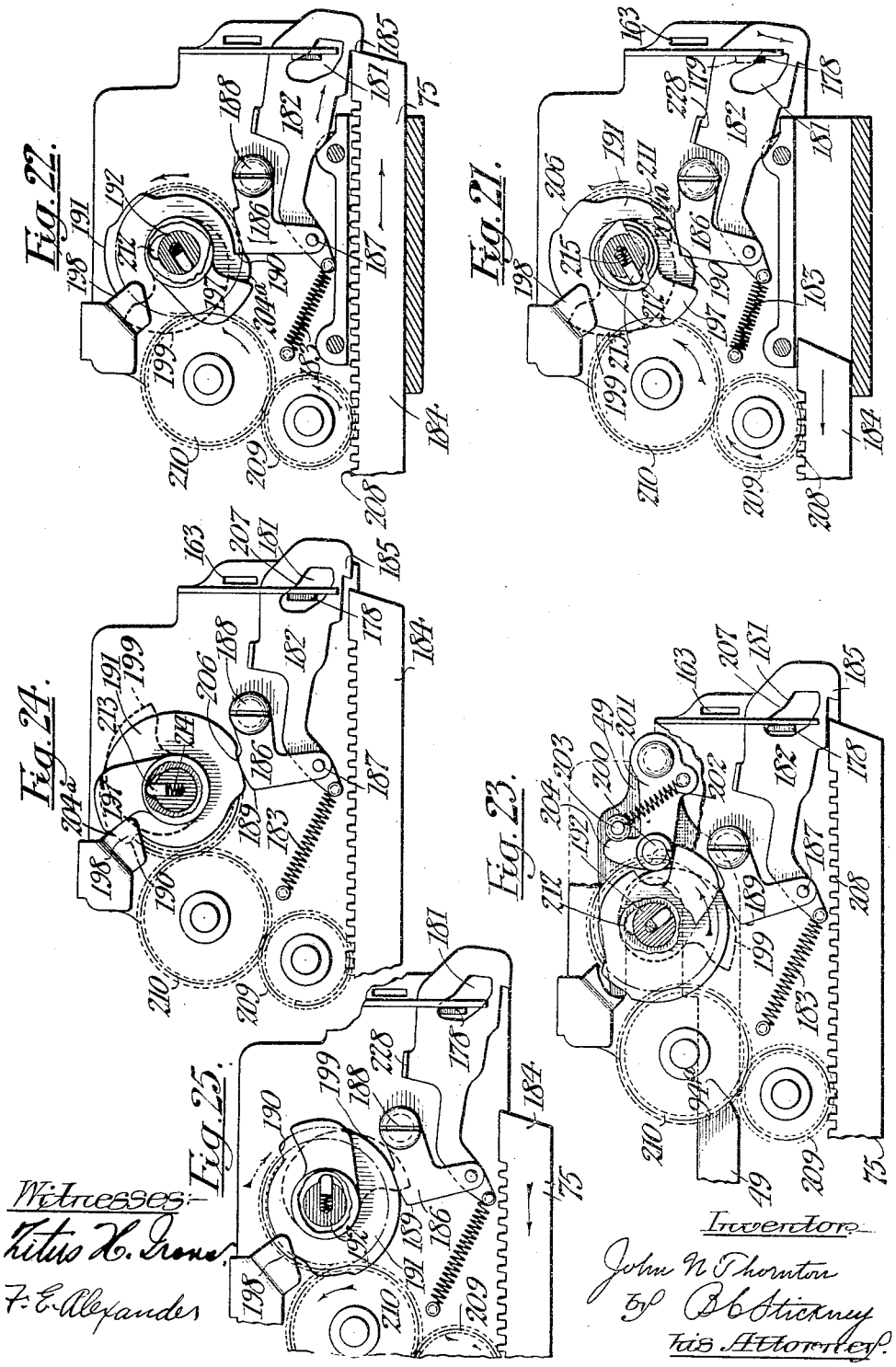

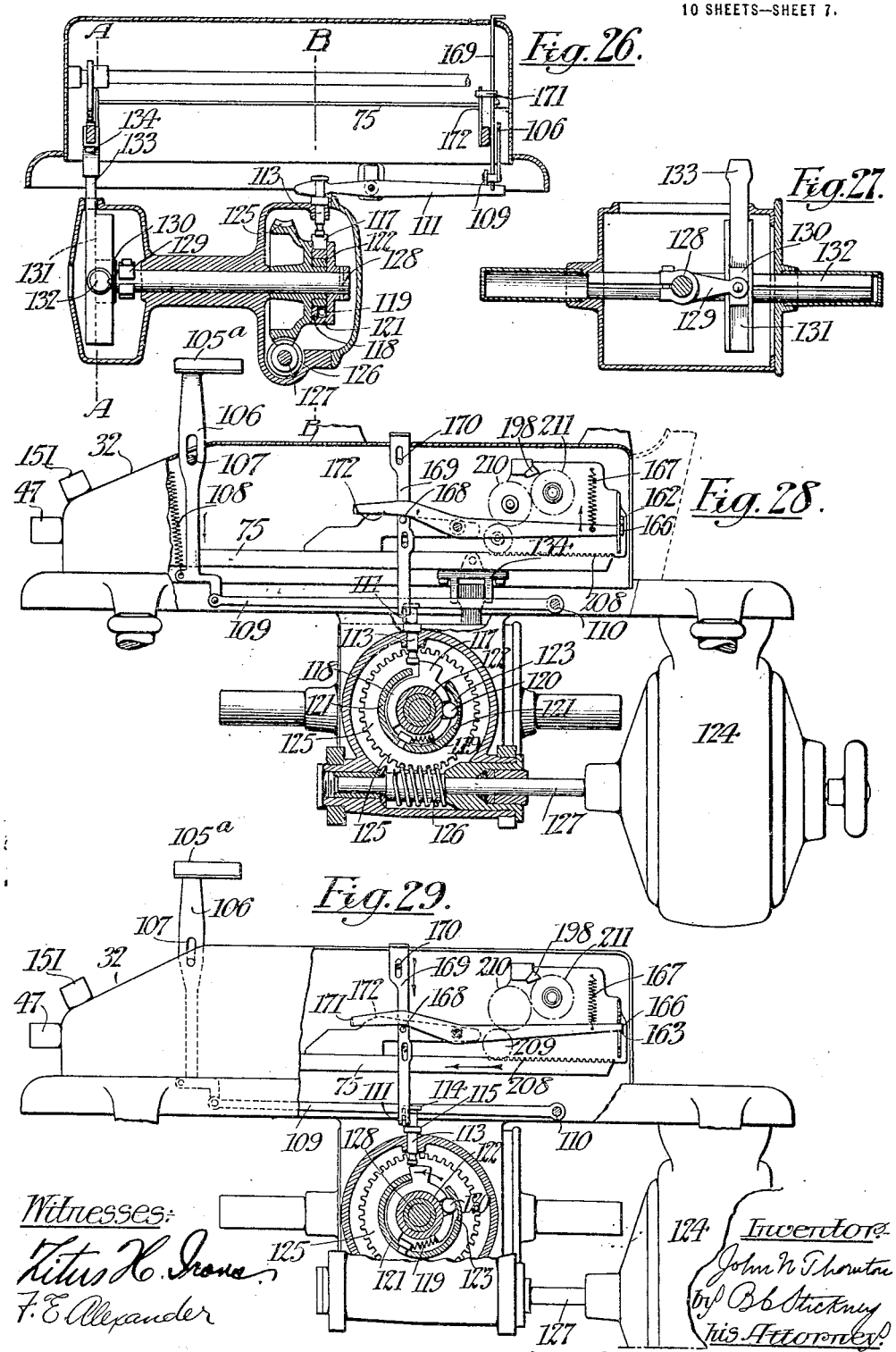

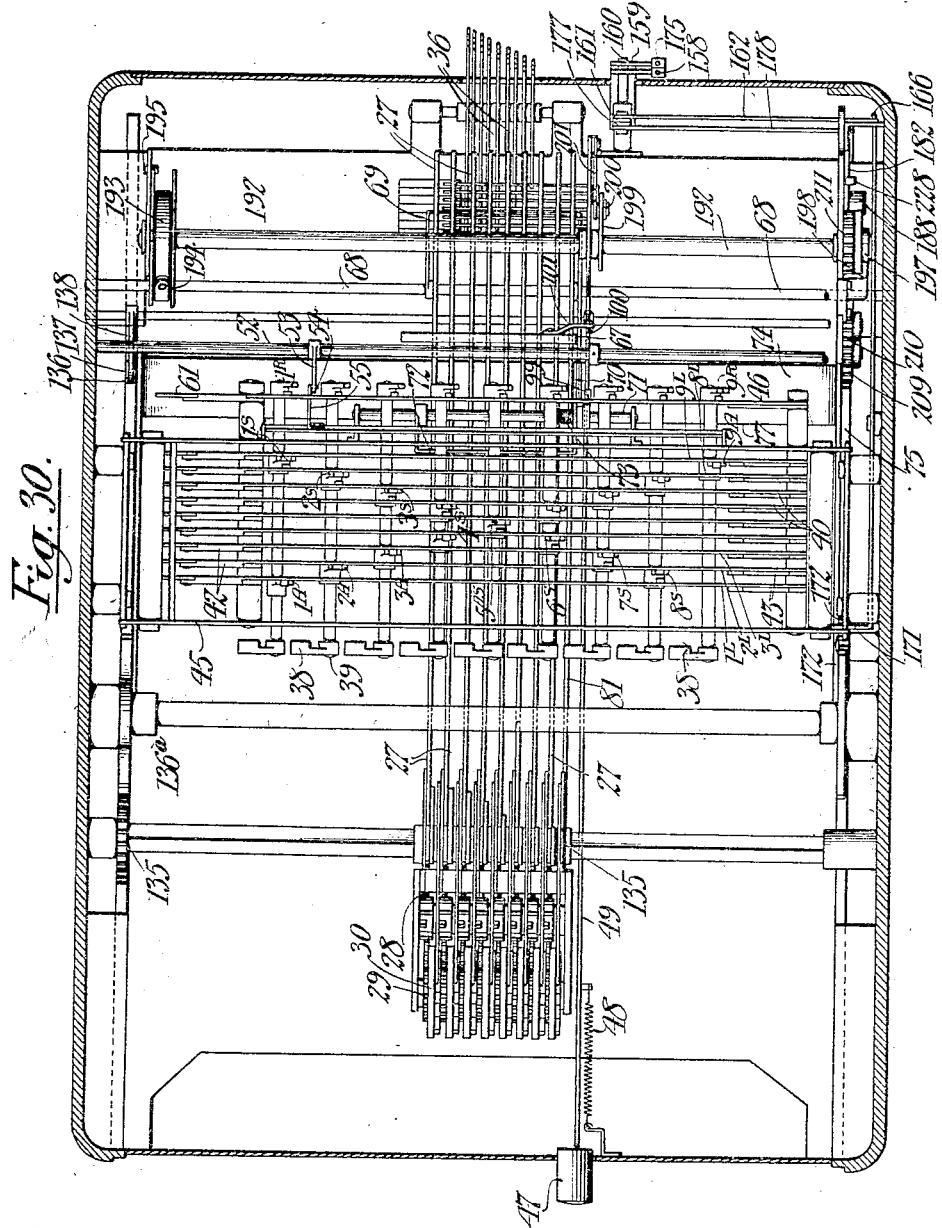

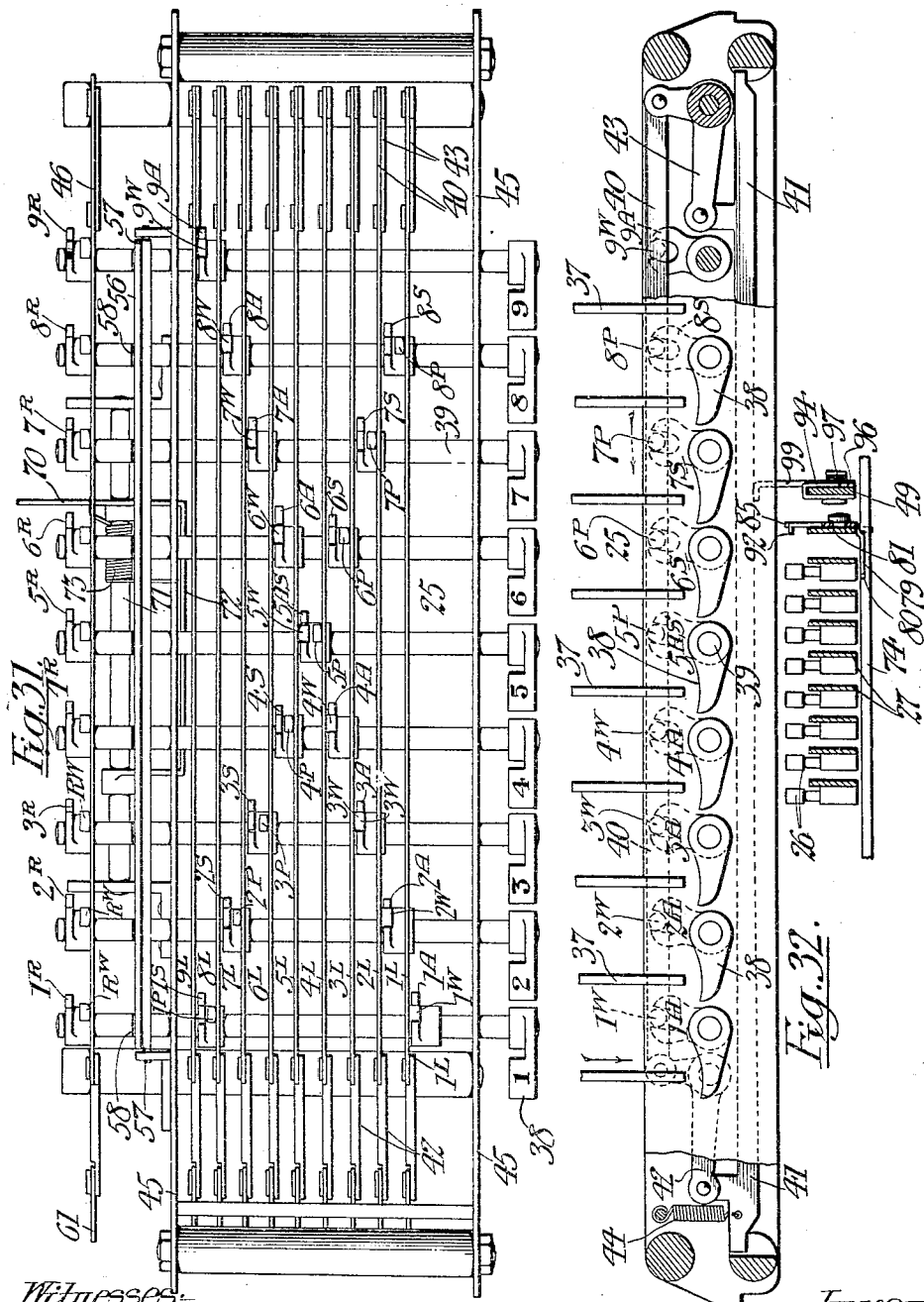

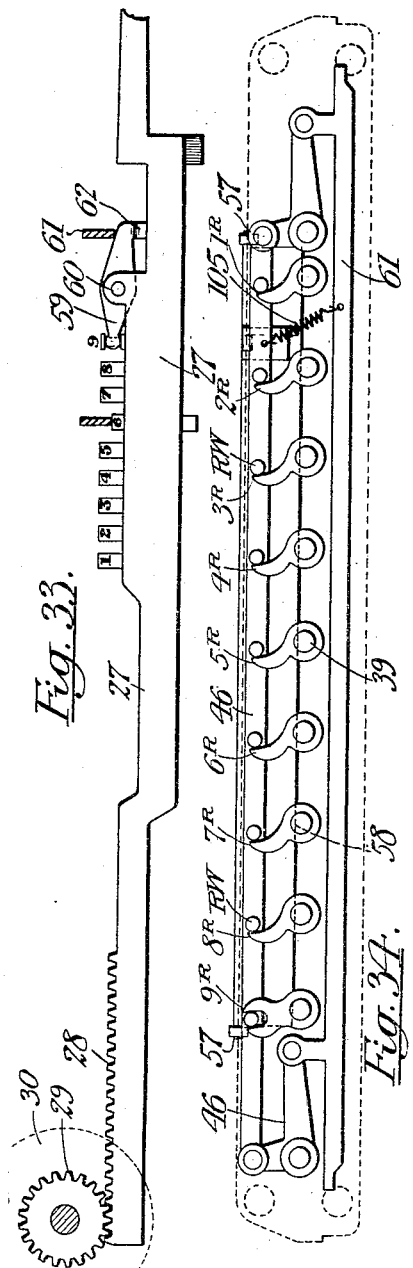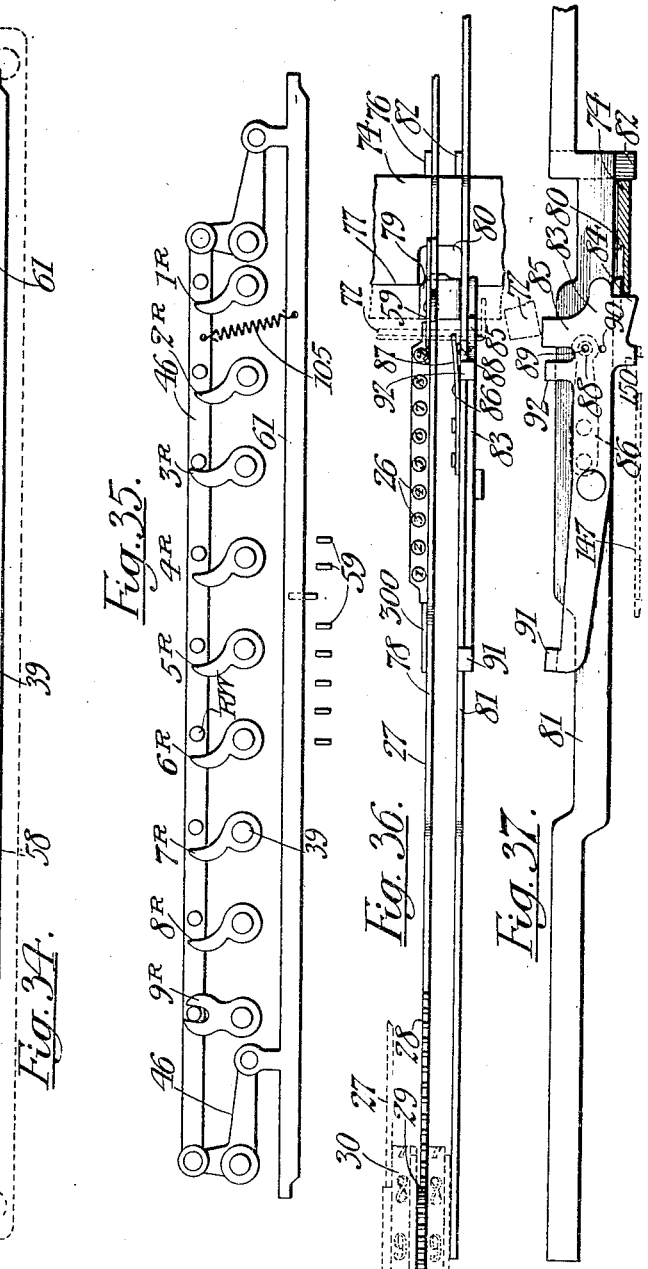

UNITED STATES PATENT OFFICE.

JOHN N. THORNTON, OF JERSEY CITY, NEW JERSEY, ASSIGNOR, BY MESNE ASSIGN-
MENTS, TO UNDERWOOD COMPUTING MACHINE COMPANY, OF NEW YORK, N. Y., A
CORPORATION OF NEW YORK.

COMBINED TYPE-WRITING AND COMPUTING MACHINE.

1,283,360.      Specification of Letters Patent.      Patented Oct. 29, 1918.

Application filed May 22, 1913. Serial No. 769,132.

*To all whom it may concern:*

Be it known that I, JOHN N. THORNTON, a citizen of the United States, residing in Jersey City, in the county of Hudson and State of New Jersey, have invented certain new and useful Improvements in Combined Type-Writing and Computing Machines, of which the following is a specification.

This invention relates to a combined type-writing and computing machine of the Underwood-Hanson type and more especially to means for automatically setting the machine for subtraction at predetermined points in the travel of the typewriter carriage, and is an improvement on an application of Hans Hanson, No. 626,550, filed May 11, 1911.

In this type of machine the numbers to be computed are accumulated by a setting-up of individuals of a nest of pins by a method of cross selection to correspond with the particular numeral keys struck and to the particular denominational columns in which they are struck. The numbers thus accumulated are run up by the actuation of a general operator which moves all of the pin-bearing members distances corresponding to the particular pins set up thereon, so as to transfer the numbers to associated dial or computing wheels.

In subtraction, the complementary method is used; that is to say, instead of directly rotating the computing wheels in the reverse direction an amount corresponding to the numeral keys struck, they are rotated in the same direction an amount equal to the complement of the numbers corresponding to the numeral keys struck. To do this, the pin-setting mechanism is transposed, so that instead of setting up a pin corresponding to the numeral key struck, a pin corresponding to the complement of the numeral key struck, using nine as the base or measure, is set up. Of course, if the zero key should happen to be struck in any column, it is essential that the complement thereof, or the "9" pin, should be set up on the pin-bearing member in the particular denominational column, so that the associated computing wheel will be rotated nine-tenths of a revolution. This condition is anticipated in setting the machine for subtraction, by setting up all of the "9" pins concomitantly before any digit of the particular number to be subtracted is accumulated. Then when any digit is accumulated in any particular column that is other than "0", and the corresponding pin set, the "9" pin will be unset.

In this complementary method of subtracting, it is essential to give the computing wheel of lowest denomination, that is, the units or cents wheel, an additional step of revolution, so as to make the units wheel rotate one complete revolution in case "0" was subtracted, and to carry one to the other computing wheels. That is to say, if we set the machine for subtraction and then subtracted "0" from all of the computing wheels, the "9" pins would remain set up giving all the computing wheels nine-tenths of a revolution, with the exception of the units wheel which would be given a complete revolution, so that it would carry one to the next computing wheel, which in turn would carry to the next higher computing wheel, and so on, whereby all of the computing wheels would be given one complete revolution. It will readily be seen then that the operation is, substantially, giving all the computing wheels one complete revolution less the value of the particular digit to be subtracted from each computing wheel, using nine as the base or measure in obtaining the complement. The above operation has been accomplished in the past by the manual setting of a subtraction key by the operative.

In this invention, while still admitting of manual setting, it is the intention to relieve the operative of all thought and trouble regarding the matter and to set the machine for subtraction automatically at such points as it is desired to subtract according to the particular kind of work being done. For example, if we are cross-adding three or more vertical columns of numbers, we may add in the first two and subtract in the third, providing means for automatically setting the machine for adding and for subtracting just before the particular columns in which it is desired to add and subtract have been reached. In other words, the travel of the carriage is made use of in automatically determining the state or character of action of the computing mechanism to correspond with the particular computing action desired at particular points in the travel of the carriage.

To accomplish the above, use is made of tappets or stops adjustably mounted at variable points on the carriage, which stops may also be used, if desired, for the purpose of tabulating. At least two types of tappets may be used. One type is used solely for addition and another type is used to set the mechanism for a subsequent subtracting action in the next column. The subtraction tappet sets a releaser ready to be engaged at a subsequent movement of the general operator, so as to start in action subtraction-setting mechanism. In other words, if in advance of a subtraction column we have accumulated in the nest of pins, a number, which, we will say for the purpose of illustration, it is desired to add in the series of computing wheels, then as the carriage travels either under the influence of the space bar or one of the tabulating keys toward the next or subtraction column, a stop or tappet carried by the carriage will first actuate a trip which drops the releaser to a position to be in the path of the general operator of the computing mechanism on the return stroke thereof. This tappet or stop also actuates a second trip which connects the general operator up to a motor, from which it is normally disconnected, so that the general operator will be given a complete cycle of movements including a back-and-forth stroke, wherein it will run up on the computing wheels, the digits accumulated in the preceding action to add them to any which may already be exhibited by the computing wheels. Then on its return stroke the general operator will engage the previously dropped releaser and actuate the same, so that it disengages a latch which normally prevents the rotation of an auxiliary motor. This motor drives a cam which actuates mechanism to set up all the "9" pins and to shift the pin-setting mechanism to a position such that it will set up pins corresponding to the complements of the numeral keys struck. Mechanism is also actuated at the same time to give a supernumerary bar, corresponding to the pin-bearing bars and below the units or cents pin bar, a motion on the succeeding movement of the general operator, one step in excess of nine points, the extra step of which movement will be added to the amount run up on the units computing wheel by the engagement of a projection or lug on the supernumerary bar with the particular pin set up on the units bar. This then enables all functions necessary to a complementary subtraction action to be brought about automatically by the carriage, so that when the carriage is in a position to have numbers written on the work-sheet, which it is desired to subtract, such as debit items, then the computing mechanism will likewise be in a condition to automatically subtract such numbers.

Other features and advantages will hereinafter appear.

In the accompanying drawings—

Figure 1 is a vertical section taken from front to rear of the machine with parts omitted for the sake of simplifying the showing; the elements shown being in their normal adding positions.

Fig. 2 is an enlarged detail view of a portion of the subtraction-setting mechanism, showing the same after the machine has been set for subtraction and with the toggle collapsed.

Fig. 3 is a detail view showing the auxiliary motor for setting the subtraction mechanism.

Fig. 4 is a skeleton perspective view illustrating the automatic means for connecting up the general operator with the motor from the carriage by means of a tappet carried by the carriage, and also showing the means for automatically setting the machine for subtraction from the carriage by means of a different type of tappet carried by the carriage; the parts being in the positions they would assume subsequent to a subtraction setting and after the error key has been actuated to eliminate the same.

Fig. 5 is an enlarged view in elevation showing the latches for the motor and for the subtraction releaser, illustrating one in its withdrawn position and the other in its effective position.

Fig. 6 is a rear view in elevation with the casing broken away to show the underlying structure.

Fig. 7 is a detail view showing the relation of the tappets or stops carried by the carriage to the trips and illustrating the subtraction trip in the act of being depressed by one of the tappets or stops to enable a subsequent subtracting action.

Fig. 8 is a view similar to Fig. 7, with the exception that the motor or addition trip is being depressed to enable the connection of the general operator to the motor so that a complete cycle of action of the general operator will take place.

Fig. 9 is a top plan view in detail showing the two trips which coöperate with the tappets or stops carried by the carriage.

Figs. 10, 11 and 12 show three forms of tappets or stops; the one being capable of coöperating solely with the motor or addition trip; the second coöperating with both the motor trip and the subtraction trip, and the third merely acting as a tabulating stop and coöperating with neither of the trips.

Fig. 13 is a detail top plan view of the pin-bars, with certain parts of the subtraction mechanism for setting the "9" pins.

Fig. 14 is a vertical section from front to rear, taken through the pin-setting mechanism and also through the subtraction-setting mechanism, showing the parts in such relation that they will perform a subtracting operation instead of an adding operation, the subtraction setting being not quite completed.

Fig. 15 is a contracted top plan view showing the auxiliary motor shaft and a detail of the camming mechanism whereby the machine is set for subtraction.

Fig. 16 is a vertical section taken from front to rear of the parts shown in Fig. 15.

Fig. 17 is a vertical section taken from front to rear showing the subtraction-setting mechanism, with the parts in their normal position before the releaser has been dropped to such a position that it can remove the detaining latch from its operative position.

Fig. 18 is a view of the parts shown in Fig. 17 taken at right angles thereto.

Fig. 19 shows the position next succeeding that shown in Figs. 17 and 18 for the subtracting action, in which the releaser has been dropped to the position resting on the general operator, so that it can be actuated at the return movement of the general operator which is just about to start on its forward movement.

Fig. 20 is a vertical section through the parts as illustrated in Fig. 19.

Fig. 21 is a view of the parts shown in Figs. 17 and 19, showing that the general operator has been moved forward to permit the releaser to drop into the path of the general operator when it returns.

Fig. 22 shows the general operator returning and engaging the releaser to move the latch to such a position that the motor is free to rotate and thus actuate the subtraction-setting mechanism.

Fig. 23 shows the motor in the act of rotating with the cam driven thereby moving the subtraction-setting mechanism.

Fig. 24 is a view of the parts shown in Figs. 17 to 23 with the motor at the end of its movement and brought to rest.

Fig. 25 is a view of the parts shown in Fig. 24, showing the next succeeding position with the motor being rewound on a subsequent forward movement of the general operator.

Fig. 26 is a detail section showing the means for connecting the general operator to the main motor.

Fig. 27 is a view taken at right angles to the view illustrated in Fig. 26 along the line A—A.

Fig. 28 is a detail view of the clutch for connecting the motor to the general operator taken at right angles to the view shown in Fig. 26 along the line B—B.

Fig. 29 is a view similar to Fig. 28, with the exception that the clutch has been released to enable it to connect the motor shaft in driving relation with the general operator.

Fig. 30 is a horizontal sectional view taken just above the pin-setting linkages and showing the general relation of the pin-bars to the computing wheels.

Fig. 31 is an enlarged detail view of the pin-setting linkages showing the linkages in their adding position.

Fig. 32 is a detail view in elevation with parts broken away to show the underlying structure, illustrating the means whereby the pin-setting linkages are actuated from the numeral keys.

Fig. 33 is a detail view in side elevation of one of the pin-bearing rack bars, showing how the "9" pin is unset in a subtracting operation when some other pin is set.

Fig. 34 is a detail view in elevation of the link which restores the "9" pins, showing the link in its dormant or inactive position.

Fig. 35 is a view similar to Fig. 34, with the exception that the link is shown active in the act of unsetting one of the "9" pins.

Fig. 36 is a detail top plan view showing the relation of the supernumerary bar to the units or cents bar, whereby in the subtracting operation this units or cents bar is given a movement one step in excess of the movement which it would normally have for the particular pin set up.

Fig. 37 is a view of the parts shown in Fig. 36 taken in elevation and showing the same set for the subtracting operation, whereby the supernumerary bar would give the units or cents bar an extra step of movement.

Referring more particularly to the separate parts of this invention, as embodied in the form shown in the drawings, 1 indicates numeral keys and 2 character keys, which are mounted on key-levers 3, arranged to rock bell-cranks 4 and thus swing type-bars 5 up rearwardly against the front side of a platen 6, mounted to rotate on a carriage 7. The carriage 7 has a step-by-step movement controlled at the actuation of each of the numeral keys by an escapement mechanism indicated in general at 8. This escapement mechanism includes a rack bar 9, movably mounted on the carriage 7 by means of a pair of arms 10 pivoted to the carriage. The rack-bar 9 meshes detachably with a pinion 11 mounted on the same shaft as a ratchet wheel 12, which is controlled in its movement by fixed and movable dogs 13, the latter being oscillated at the actuation of any of the character or numeral keys by means of a universal bar 14, which in turn is actuated by a heel 15ª formed on each of the type-bars 5.

In addition to the step-by-step movement of the carriage 7, provision is made for a jump or tabulating movement. For this purpose, there are provided tabulating keys 15, mounted on key-levers 16, which are pivoted intermediate their ends and support thrust bars or plungers 17 at their rear ends. These thrust bars 17 are arranged to be projected by their associated keys into the path of tappets or stops 18, adjustably mounted on a rack 19 carried by the carriage 7. When any one of the tabulating keys 15 is depressed and thus when any one of the plungers 17 is raised, the carriage 7 will be disconnected from the escapement mechanism 8 by means of a universal lever 20, which engages in a series of notches 21 provided in the plungers 17. This lever 20 when rocked by one of the plungers 17, pulls down on a link 22, which rocks a lever 23 carrying at its front end a roller 24, which is arranged to lift the rack-bar 9 out of mesh with the pinion 11.

In addition to actuating the type action of the typewriting mechanism, the numeral keys 1 are arranged to control a pin-setting mechanism indicated in general at 25, which sets pins 26 mounted on a series of bars 27, which are provided at their front ends with racks 28 engaging with pinions 29 for dial or computing wheels 30 having numbers on their peripheries arranged to be exhibited through a sight opening 31 in the casing 32 of the computing mechanism.

In order that any one of the pins 26 on the bars 27 may be set, the bar carrying the pin must be raised above its fellows, as the pin-setting mechanism 25 has but a limited sphere of action. For this purpose, there is provided on the carriage, a tappet 33, which, during a traveling movement of the carriage, comes successively into engagement with individuals of a series of jacks 34, one for each of the computing wheels 30. These jacks are pivoted intermediate their ends, so that when engaged by the tappet 33, they will be rocked to depress thrust links 35, which are connected to transposition linkages 36, which in turn raise the rack bars 27. The linkages 36 invert the order of action of the rack bars 27 from that of the jacks 34, so that the progressive movement of the carriage, which travels from right to left, may correspond to the progressive action of the computing which travels from left to right of the computing wheels 30.

The pin-setting mechanism 25 not only sets the pins 26 for addition but is also capable of setting them for subtraction. The particular arrangement and action of the pin-setting mechanism will now be described.

Referring to Figs. 1, 31 and 32, it will be seen that each of the numeral keys 1 is provided with a thrust link 37, which is arranged to engage an arm 38 on a rock shaft 39, there being one of these arms and one of these rock shafts for each of the numeral keys from "1" to "9".

Mounted on the shafts 39, there are provided addition arms $1^A$, $2^A$, $3^A$, $4^A$, $5^{AS}$, $6^A$, $7^A$, $8^A$ and $9^A$. Each of these arms is arranged to engage, when the associated arm 38 is depressed, with the corresponding one of a series of wrist-pins $1^W$, $2^W$, $3^W$, $4^W$, $5^W$, $6^W$, $7^W$, $8^W$, and $9^W$ on a series of pin-setting linkages $1^L$, $2^L$, $3^L$, $4^L$, $5^L$, $6^L$, $7^L$, $8^L$, and $9^L$. Each of these linkages, as will be seen by reference to Fig. 32, comprises an upper reach 40, and a lower reach 41 parallel to the upper reach 40 and connected thereto by a pair of bell crank levers 42 and 43, so that the motion of the reaches 40 and 41 will always be parallel. These linkages are held normally in close collapse with the lower reach 41 raised, by means of one or more springs 44. When, however, one of the rock shafts 39 is rotated by the engagement of one of the thrust links 37 with the associated arm 38, then the lower reach 41 will be depressed to engage and set the corresponding pin 26 on the particular bar 27 which happens to be raised by the action of the tappet 33 engaging one of the jacks 34.

As shown in Fig. 31, the parts are in position for an adding operation. If it is desired to perform a subtracting action by the complementary method, then the parts are moved from the position shown in Fig. 31 to the position shown in Fig. 14. That is to say, all of the rock shafts 39 are mounted to slide in a frame 45 and can be shifted from the Fig. 31 position to the Fig. 14 position, to remove all of the arms $1^A$, $2^A$, $3^A$, $4^A$, $5^{AS}$, $6^A$, $7^A$, $8^A$ and $9^A$ out of engagement with the wrist pins $1^W$, $2^W$, $3^W$, $4^W$, $5^W$, $6^W$, $7^W$, $8^W$ and $9^W$, at the same time moving a series of arms $1^S$, $2^S$, $3^S$, $4^S$, $5^{AS}$, $6^S$, $7^S$ and $8^S$ into engagement with wrist pins $1^P$, $2^P$, $3^P$, $4^P$, $5^P$, $6^P$, $7^P$, and $8^P$, on the pin-setting linkages $8^L$, $7^L$, $6^L$, $5^L$, $4^L$, $3^L$, $2^L$ and $1^L$, respectively. The arms $1^S$, $2^S$, $3^S$, $4^S$, $5^{AS}$, $6^S$, $7^S$ and $8^S$ are on the shafts 39 which correspond to their number and the number of the numeral key which actuates these shafts. It will be noted in passing that the arm $5^{AS}$ corresponding to the numeral key 5, is used for both addition and subtraction, inasmuch as it lies between the $5^L$, and $4^L$ linkages which correspond to the adding of five and the subtracting of five, respectively. There is no subtraction arm provided for the "9" set as the complement of nine is zero in this system.

In addition to the arms just mentioned, each of the shafts 39 carries a restoring arm indicated successively to correspond with the accordant numeral keys $1^R$, $2^R$, $3^R$, $4^R$, $5^R$, $6^R$, $7^R$, $8^R$ and $9^R$ (Figs. 31, 34 and 35), which at the shifting of the rock shafts 39 in the frame 45, are brought into engagement with wrist pins RW on a "9" pin restoring linkage 46, acting similarly to the linkages $1^L$, $2^L$, $3^L$, $4^L$, $5^L$, $6^L$, $7^L$ and $8^L$, except that it restores the "9" pins which have been previously set up, as will be described hereinafter.

The shafts 39 and other coöperating mechanism may be shifted manually for the purpose of affording a subtracting relation of the computing mechanism. For this purpose, there may be provided a subtraction key 47 (Figs. 1, 4 and 14), which, when pressed rearwardly against the tension of a spring 48, carries with it a subtraction rod 49. Mounted on the subtraction rod 49, there is a pin 50 engaging between the forks of an arm 51 secured to a rock shaft 52, so as to rock the same and thus swing an arm 53 secured to the shaft 52 and engaging, by means of a fork, a pin 54 so as to oscillate an arm 55, which is secured to a shifter bar 56, pivoted at its upper edge and opposite ends as at 57. The shifter bar 56 extends into a series of alined slots 58 provided in each of the pin-setting rock shafts 39, so that when the subtraction key 47 is thrust rearwardly, it will swing the lower edge of the shifter bar 56 forward and thus shift all of the rock shafts 39 forward to a position such that the arms $1^A$, $2^A$, $3^A$, $4^A$, $5^{AS}$, $6^A$, $7^A$, $8^A$ and $9^A$ are shifted out of engagement with their wrist pins $1^W$, $2^W$, $3^W$, $4^W$, $5^W$, $6^W$, $7^W$, $8^W$ and $9^W$, and at the same time the subtraction arms $1^S$, $2^S$, $3^S$, $4^S$ $5^{AS}$, $6^S$, $7^S$ and $8^S$ are shifted into engagement with the corresponding wrist pins $1^P$, $2^P$, $3^P$, $4^P$, $5^P$, $6^P$, $7^P$ and $8^P$. This shifting also brings the pin-restoring arms $1^R$, $2^R$, $3^R$, &c., into engagement with the wrist pins RW on the pin-restoring linkage 46. Such an action changes the pin-setting mechanism from a state in which it can set pins corresponding to the numeral keys actuated, to the opposite state in which it will set pins corresponding to the complements of the numeral keys struck, using one less than the exchange value, that is nine, as the base or complete number.

As has been stated above, it is necessary at this time to set all of the "9" pins so that if no number is subtracted in any particular denominational column, the computing wheel will have a chance to rotate a complete revolution. For this purpose, each of the "9" pins is provided with a reduced portion or neck (Figs. 13, 14 and 33) having shoulders on opposite sides thereof, between which engages one end of a lever 59 pivotally mounted intermediate its ends on the associated pin-bar, as at 60, and projecting rearwardly to a point underlying the lower reach 61 of the pin-restoring linkage 46. That is to say, there is one of these levers 59 for each of the pin-bars 27, engaging the "9" pin thereof so as to be capable of setting it and unsetting it. Each of the levers 59 is provided at its rear end, with a downwardly-projecting tail 62, limiting the restoring motion of the lever when actuated by the pin-restoring linkage 46.

To set the "9" pins at the actuation of the subtraction key 47 (Figs. 1, 4, 13 and 14), there is provided on the subtraction rod 49, a lug or extension 63, which engages the knuckle of a toggle 64, comprising links 65 and 66, so as to spread this toggle, forcing the free ends of the toggle apart so that the lower link 66 will rock an arm 67 mounted on a shaft 68 and connected to a universal U-shaped frame 69 underlying all of the pin-bars 27, so that this frame will be raised to raise all of the pin-bearing bars 27. Simultaneously with the raising of the pin-bearing bars 27, the upper link 65 of the toggle will rock an arm 70, mounted on a shaft 71 and secured to a universal U-shaped frame 72, which overlies all of the "9" pin levers 59 at a point forward of their pivots 60.

It will thus be seen that simultaneously with the raising of the pin-bearing bars 27 by the spreading of the toggle 64, the same action will rock down the universal frame 72 against the tension of a spring 73, so that the forward ends of all of the "9" pin levers 59 are depressed to depress the "9" pins from the dotted-line position shown in Fig. 14 to the full-line position shown in Fig. 14, so that all of the "9" pins will be set to correspond with the nine-step movement of their associated pin-bearing rack bars.

At this time care is taken to provide also for an extra step movement of the units or cents pin-bearing rack bar and its computing wheel. The extent of movement of the rack bars to rotate the associated computing wheels depends upon the particular pins set up thereon, as stated above. These pins are engaged by a cross bar 74 on a general operator 75, which is reciprocated in a manner to be described, so that on its forward motion it engages the set pin to force the pin-bearing rack bars forward an amount corresponding to the particular pins set up, and so that on its rearward motion it will return the rack bars by engagement with fixed lugs 76, one of which is provided on each of the rack bars.

As will be seen by reference to Figs. 36 and 37, the cross bar 74 of the general operator has a uniform front edge 77, except that portion which comes into engagement with the set pins on the units or cents bar indicated specifically at 78 in Fig. 36. That is to say, the general operator cross bar 74 has a piece 79 cut out of the front edge thereof, which piece can at times enter its socket 80, as in a normal adding operation, so that the units or cents pin-bearing rack bars will be given a movement corresponding to the particular pin set up thereon; or, in other words, the front edge of the cut-out portion 79 will come into alinement with the front edge 77 of the body portion of the general operator cross bar 74.

For a subtracting operation, however, this cut-out portion 79 is located forward with its front edge one step in advance of the front edge 77 of the general operator cross bar 74, so that it will come into contact with whatever pin happens to be set on the units or cents bar 78 one step prior to the engagement of the front edge 77 with the corresponding pin on any of the other pin-bearing rack bars. To maintain this forward placement of the cut-out portion 79, there is provided a supernumerary bar 81 corresponding to the other pin-bearing rack bars 27, with the exception that it is unprovided with a rack in that it does not rotate any computing wheel directly and unprovided with pins. The supernumerary bar 81, however, carries the cut-out portion 79, so that it will reciprocate with the general operator cross bar 74.

In the normal adding operation, the cut-out portion 79 will be overtaken by the general operator cross bar 74 before the front edge 77 comes into engagement with any of the set pins on the pin-bearing rack bars, at which time the front edge of the cut-out portion 79 will be located in alinement with the front edge of the cross bar 74, so that all the pin-bearing rack bars will be given movements corresponding exactly to the pins set up thereon. At the end of the forward stroke of the general operator cross bar 74, a lug 82 on the supernumerary bar 81, corresponding to the lug 76 on the pin-bearing bars, will be located one step to the rear of the bar 74, so that on the return movement of the latter the supernumerary bar 81 and the portion 79 carried thereby will lag behind the cross bar 74 one step until the latter overtakes it, whereby when the general operator cross bar 74 comes to its home position, the front edge of the cut-out portion 79 will be located one step in advance of the front edge 77 of the cross bar 74.

As stated above, in the subtracting operation it is necessary to maintain the cut-out portion 79 in its advanced position with respect to the general operator cross bar 74. For this purpose, when the "9" pins are set up by the universal frame 72, a trigger 83 pivotally mounted on the supernumerary bar 81 is forced down from a raised position out of the path of the general operator cross bar 74, to a depressed position with a shoulder 84 thereon into the path of the front edge 77 of the general operator cross bar 74, by the engagement of the "9" pin setting universal frame 72 with an upwardly-extending finger 85 on the trigger 83. The trigger 83 is held in its two positions of adjustment by a yielding detent 86 having a spring arm 87 which forces a ball or roller 88 alternately into either one of a pair of sockets 89 and 90 provided in the trigger 83. That is to say, the ball 88 is located in an opening in the supernumerary bar 81 and is engaged on one side by the spring 86 and on the other side by the trigger 83, and when one of the sockets 89, 90 comes into register therewith, the ball drops into the socket and holds the trigger 83 in the particular position of adjustment corresponding to the registering of the particular socket with the ball. The up and down movements of the trigger 83 are limited, respectively, by lugs 91 and 92, which overhang the top edge of the supernumerary bar 81 at opposite sides of the pivot of the trigger 83.

It will thus be seen that when the "9" pins are set up for a subtracting operation, the trigger 83 will at the same time be depressed to bring its shoulder 84 into the path of the general operator cross bar 74, so that the front edge of the cutout portion 79 carried by the supernumerary bar 81, will be maintained one step in advance of the front edge 77 of the general operator cross bar 74, whereby it will come into engagement with the particular pin which happens to be set up on the units or cents bar 78 one step in advance of the corresponding engagement of the front edge 77 with a corresponding pin set up on any of the other pin-bearing rack-bars 27. This, then, gives to the units or cents wheel a rotation one step in excess of that which it would receive to correspond with the particular pin set up on its associated rack bar. For example, if zero were subtracted in the cents or units column then the "9" pin would remain set up and the units or cents wheel would receive a rotation not only of nine steps but one step in excess thereof, so that it would be revolved ten steps or a complete revolution in this decimal system, whereby one would be carried to the next higher computing wheel.

After these actions have been accomplished, the substraction bar 49 approaches the end of its motion when it is locked in its set position by a dog 93 engaging a notch 94ª in the subtraction bar 49, as in Fig. 2. Before the subtraction bar 49, however, has entirely completed its rearward movement, the toggle 64 is permitted to collapse from its Fig. 14 position to its Figs. 2 and 4 position, so as to remove the universal pin-setting frame 72 and the pin-bar-raising frame 69 out of engagement with the port subservient thereto, so as to permit the pin-bars to drop to their normal position, and raise the "9" pin-setting frame 72 clear of the "9" pin levers 59. To accomplish this, the lug or projection 63, which engages the knuckle of the toggle 64, is adjustably mounted on the subtraction rod 49 to admit of its having a relative movement toward the front with respect to this rod. For this purpose, the toggle-spreading projection 63 is secured to a slide 94 having a pin-and-slot connection 95 with the subtraction key rod 49 (Figs. 1, 2 and 14).

The slide 94 bearing the lug 63, is normally held in its rearmost position by a latch 96 pivotally mounted at 97, on the subtraction rod 49, and engaging a shoulder 98 provided on the slide 94. The latch 96 is also provided with an upstanding finger or arm 99, arranged to engage, during the final rearward movement of the subtraction rod 49, with an adjustable stop or tripper 100 located in the path of movement of the finger 99. This stop or tripper 100 is shown in the form of a screw adjustably mounted on a fixed bracket 101, so that the instant of its action can be varied to a nicety. When the finger 99 engages the tripper 100, the nose of the latch 96 is drawn out of engagement with the shoulder 98, so that the spring 73 is free to act, collapsing the toggle 64 from the position shown in Fig. 14 to the position shown in Fig. 2, forcing the slide 94 forward, raising the universal "9" pin-setting frame 72 out of engagement with the "9" pin levers 59 and also depressing the rack-bar-raising frame 69 from the position shown in Fig. 14 to the position shown in Fig. 1, whereby the pin-bars will assume a normal position ready to receive the accumulation of the number to be subtracted.

On a subsequent return movement of the subtraction key rod 49 under the traction of the spring 48, when the subtraction key rod is released by a movement of the dog 93 out of the notch 94ª, then the slide 94 will return to its rearward position with respect to the subtraction key rod 49 by being held against forward movement by engaging with a stationary finger 102, extending downwardly from the frame 45 into the path of a shoulder on the slide 94. The latch 96 will be cammed against the tension of a spring 103 therefor, by a cam surface 104 on the slide 94, until it reaches a position such that the nose thereof will drop back into engagement with the shoulder 98 on the slide 94 when the slide will once more be locked in its rearmost position on the subtraction key rod 49.

At this point the mechanism is in condition to receive the setting-up of pins corresponding to the digits of a number to be subtracted. That is to say, the numeral keys 1 may now be operated so that the digits of a number to be subtracted will be written on the work-sheet carried by the platen 6 and set up in the computing mechanism. The rack bars 27 will be raised *seriatim,* owing to the tappet 33 rocking the jacks 34 successively, which in turn raises the rack bars 27 *seriatim* above their fellows. As each numeral key is struck, the thrust rod 37 depending therefrom, will rock the associated rock shaft 39, so as to actuate the connected pin-setting linkage, which is now connected for subtraction instead of addition, whereby the pin corresponding to the complement of the particular numeral key actuated, using nine as the base, will be set up. At the same time, one of the arms $1^R$ to $9^R$, corresponding to the particular numeral key actuated, will also be swung, through the rocking of the shaft 39, to engage one of the pins RW on the "9" pin-restoring linkage 46, so that the lower reach 61 thereof will be depressed against the tension of a spring 105 from the Fig. 34 position to the Figs. 33 and 35 position, such that it will engage with the rear end of the "9" pin lever 59 on the particular pin-bearing rack bar 27 which happens to be raised above its fellows, so that the lever 59 will be rocked to raise the forward end and thus unset the "9" pin on this bar at the setting of another pin thereon.

In the illustration shown in Figs. 33 to 35 inclusive, the digit "3" is being subtracted in the hundreds column, that is to say, in the denomination three points removed from the lowest denomination. Hence, when the numeral key "3" is struck, the arm $3^S$ will rock, so as to swing the pin $3^P$ and thus rock the pin-setting linkage $6^L$, which, as illustrated in Fig. 33, is depressed to set the "6" pin on the pin-bearing rack bar 27 corresponding to the third computing wheel from the right or to the hundreds denomination. At the same time, the pin-restoring arm $3^R$ engages the associated wrist pin RW on the pin-restoring linkage 46, so that the lower reach 61 of this linkage is depressed to engage the tail end of the lever 59, thereby raising the forward end so as to unset the "9" pin, that is, raise it to its normal highest position.

This operation is continued for each decimal column until the entire number to be subtracted is accumulated by the setting-up of complementary pins on the pin-bearing rack bars. The machine is then in condition for an actuation of the general operator 75, which on its forward movement will engage all of the set pins and thus rotate all the computing wheels one complete revolution less the digits of the corresponding keys actuated, or, in other words, rotate them forward an amount corresponding to the complements of the numeral keys actuated, with the exception of the units or cents wheel which is rotated one step in excess of the complement accumulated therefor.

In case the "9" key should happen to be struck in the units or cents column in a subtracting operation, then the "9" pin would be unset and no other pin set up on the corresponding rack bar. In order, under such circumstances, to give the units or cents bar an added step movement, a downwardly-projecting lug 300 is provided on the units or cents bar 78 in a position one step in advance of the "1" pin, whereby the extension or cut-out portion 79 will come into engagement therewith during the forward movement of the general operator in subtracting and advance the units or cents rack bar and the associated dial wheel one step.

In considering the means for driving the general operator it will first be shown how this can be controlled manually. At the front of the machine, there is provided a key 105ª (Figs. 4 and 28) mounted on a stem 106 having a vertical up-and-down play limited by a pin-and-slot arrangement 107. By depressing the key 105ª against the tension of a spring 108, a lever 109 is rocked about its pivot 110, so that it in turn rocks a lever 111 which it overlies and engages at 112. The lever 111 is pivoted intermediate its ends and in turn raises a stop pin 113, between two collars 114 and 115 of which it engages.

The stop pin 113 is normally held in a depressed position by a spring 116, Fig. 4, so that it lies in the path of a lug 117 on a clutch shifter 118. The pin 113 normally holds the clutch shifter 118 against the tension of a spring 119 in a position such that a friction roller or ball 120 will be in its ineffective position. That is to say, the spring 119 normally tends to throw the friction roller or ball 120 into such a position that it will form a clutch connection between a sleeve 121 and a hub 122, by the roller 120 being jammed between the sleeve 121 and the hub 122. For this purpose, the sleeve 121 is provided with a cam socket 123, which tapers from a deep portion at one end to a shallow portion at the opposite end.

When the roller 120 is in the shallow portion of the socket 123 as urged by the spring 119, it forms a clutch connection between the sleeve 121 and the hub 122, Fig. 29. When it is in the deep portion of this socket, as determined by the pin 113 obstructing the movement of the shifter 118 under the propulsion of the spring 119, then the sleeve 121 and the hub 122 are freed from connection with each other. This clutch connection forms a means of joining the general operator in driving relation with any form of motor, indicated by the electric motor 124. That is to say, the hub 122 is secured to a worm wheel 125, which is driven by a worm 126 mounted on a shaft 127, which also forms a motor shaft for the motor 124.

The other element of the clutch, to wit, the sleeve 121, is secured to a shaft 128 (Figs. 26 and 27) which extends loosely through the worm wheel 125 and is provided at its opposite end with a crank 129 carrying a cross head 130, which lies in a guideway 131 provided in a reciprocating slide 132. The slide 132 is provided with an upstanding arm 133, arranged to engage at its head in a socket 134 secured in any suitable manner to the general operator 75.

It will thus be seen that when the pin 113 is raised from the Fig. 28 position to the Fig. 29 position, the spring 119 is free to rotate the clutch shifter 118, so as to bring the friction roller 120 from the deep portion of the socket 123 to the shallow portion thereof, forming a positive connection between the sleeve 121 and the hub 122, such that the arm 133 will be oscillated by the rotation of the motor 124, thereby giving the general operator 75 one complete cycle of movements, that is to say, a back and forth sliding motion.

The clutch connection, however, is of the single-acting type, so that the general operator will be given but one cycle of movements. That is to say, the pin 113 is returned by the spring 116 to its normal depressed position as soon as pressure is released on the key 105ª or any other actuated part, so that it once more lies in the path of the lug 117, whereby when this lug comes around at the completion of a single rotation of the shaft 128 with the worm wheel 125, then the clutch shifter 118 will be held stationary while the sleeve 121 and the hub 122 travel on slightly to bring the clutching roller 120 back against the tension of the spring 119, into the deep portion of the socket 123, thereby interrupting the connection between the hub 122 and the sleeve 121.

The general operator 75 in addition to oscillating the pin-bearing rack bars 27 different amounts according to the pins set up thereon, also actuates other mechanism necessary at this time, such as the tens-carrying mechanism indicated in general at 135. This tens-carrying mechanism acts in the usual way common to the Hanson machine on the return stroke of the general operator and may be driven in any suitable manner from the general operator as by means of gearing indicated in general at 136ª.

Inasmuch as it is desirable to return the subtraction key and other connected mechanism to their normal position after a subtracting operation has been completed, use is made of the movement of the general operator, in accumulating a computation, to release the subtraction key and permit the spring 48 to return the subtraction key and the subtraction rod 49 to normal position. For this purpose, there is provided in one element of the general operator 75, to wit, one of the side bars, a cam socket 136, in which normally rests a cam follower head 137 on a tripping lever 138. When the general operator starts its forward movement, one of the sides of the socket 136 engages the head 137 and rocks the lever 138, so that one arm 139 thereof engages a pin 140 on an arm 141 of the dog 93 (Figs. 1 and 14). The dog 93 is then moved to disengaged position, permitting the spring 48 to return the key 47 and the subtraction rod 49 to normal ineffective position.

Among other functions the general operator 75 on its return stroke restores all of the set pins 26 to their normal raised position, so that they will be ready to accumulate a subsequent computation. For this purpose, there is provided on the general operator, a pawl 142 which is pivoted so as to swing idly past an arm 143 on a rock shaft 144 during the forward motion of the general operator. A spring 145, however, returns this pawl 142 to its normal position, so that on the return stroke of the general operator, the pawl 142 will act as a cam and swing the arm 143 upwardly, thereby rocking the shaft 144 and an arm 146 to engage and raise a pin-restoring plate 147, which will raise all of the set pins 26. The pin-restoring plate 147 is supported for parallel motion by means of two pairs of bell-crank levers 148, connected for parallel motion by one or more links 149.

The pin-restoring plate not only returns the set pins 26 but also engages a downwardly-projecting lug 150 (Fig. 37) on the trigger 83, which provides for an extra step movement of the units or cents computing wheel through the intermediary of the supernumerary bar 81, whereby the trigger 83, which if the previous operation was a subtracting one, will be returned to its normal uppermost position corresponding to the removal of the shoulder 84 from the path of the general operator cross bar 74, whereby the movement of the supernumerary bar 81 will no longer be one step in advance of the general operator cross bar 74.

The pin-restoring plate 147 is also used to correct an error in case the computation has been partially accumulated. For this purpose, there is provided an error key 151, which when depressed against the tension of a spring 152, will snap down, through the intermediary of a spring 153, in a manner well known in the Hanson type of machine, one end of a lever 154, which will be raised at its opposite end to engage a pin 155 carried by the pin-restoring plate 147.

In case a subtracting operation was being carried on, it would be necessary to also return the subtraction key to its normal position, so that in case it should be necessary to repeat the subtracting operation after the error has been eliminated, the subtraction key 47 could be once more actuated to set up the "9" pins and adjust the other mechanism for subtraction. For this purpose, a link 156 is connected at one end by a pin-and-slot connection admitting of a certain amount of lost motion, to one of the bell-cranks 148, and at its other end to the arm 141 of the locking dog 93 (Fig. 14).

As has been stated above, one of the main objects of this invention is to enable the connecting of the general operator in driven relation with a motor to be accomplished automatically under the control of the carriage by the position thereof, at predetermined points according as each complete number in each of the several cross columns is accumulated. For this purpose, use is made of the stops or tappets 18, which in addition to locating the position of the carriage 7 for any desired column or even a letter-space, may or may not be used to control the connection of the motor to the general operator.

If it is desired to connect up the general operator to the motor at any point in the travel of the carriage, such as subsequent to the accumulation of a number to be computed by a setting-up of the computing pins, and subsequent to the writing of this number on the work-sheet carried by the platen, then a stop 18, either of the form shown in Fig. 10 or of the form shown in Fig. 11, will be located on the rack 19 at such point. This tappet or stop 18 during a movement of the carriage in a step-by-step or letter-feeding direction, will engage a trip 157 (Figs. 4 and 6 to 9 inclusive), so as to depress the end of the same to the position shown in Fig. 8, which trip when depressed at one end will raise at its other end to pull on a link 158, so as to rock a U-shaped bail 159 forming a bell-crank lever and pivotally mounted on a stub shaft 160. The other arm 161 of this bail 159 is connected to a latch 162 slidingly mounted in a slot 163 and limited in its motion by the flange of a screw 164 entering a groove 165 therein. The latch 162 is normally located in the position shown in Fig. 6, projecting above one end of an actuating lever 166 (Fig. 4). When the trip 152 is rocked by one of the tappets 18, it withdraws the latch 162 from its position in the path of the lever 166, so that a spring 167 connected to this lever is free to raise the rear end thereof (Fig. 4), so as to force downwardly the front end thereof, whereby a pin 168, with which the front end of the lever 166 engages, will be forced down to carry with it a thrust rod 169 on which the pin is mounted.

The rod 169 has a limited vertical movement determined by a pin-and-slot mounting 170, and is forked at its lower end to rest on the tripping lever 111, so that when the thrust rod 169 is depressed at the actuation of the motor trip 157 by one of the tappets 18, the tripping lever 111 will be rocked about its pivot to raise the stop pin 113 out of the path of the projection or lug 117 on the clutch shifter 118, whereby the motor will be connected up in driving relation with the general operator and will give the same one complete cycle of movements.

In order that but a single cycle of movements may be given the general operator, the lever 166 is provided with a right-angle extension 171, which, when the lever 166 is rocked by the spring 167 to initiate a driving of the general operator by the motor, will fall into the path of a cam hump 172 (Fig. 4) on one of the bars of the general operator, whereby when the general operator starts on its forward motion, the lever 166 will be returned to its normal position, permitting the return of the stop pin 113 to its normal position to obstruct a further driving of the general operator by the motor. When the lever 166 is returned to its normal position, its rear end will be depressed, so that the latch 162 will be returned to its normal position projecting above the extremity of the lever 166, by a spring 173, the trip 157 having in the meantime been freed by the stop or tappet 18, which actuated it, having passed beyond the same during the movement of the carriage 7. It will be seen then that the trip 157 controls solely the connection of the general operator in driven relation with the motor.

It is a further object of this invention to enable the automatic control of the setting of the machine for subtraction from the carriage during the travel thereof to correspond with the subtracting operation to be carried on in the different columns determined by the location of the carriage. For this purpose, a second trip 174, which may be termed the subtraction-setting trip, is located adjacent the path of movement of the rack 19, so as to be engaged by one or more of the tappets 18, whereby it will be rocked to pull up on a link 175. This link is connected at its lower end to rock a bell-crank bail lever 176, which is pivotally mounted on the same shaft 160 on which the bail 159 is mounted and is located circumjacent the same.

The other arm of the bail lever 176, indicated at 177, is pivotally connected to a latch 178, which is slidingly mounted in a guide opening 179 (Fig. 5) and limited in its movement by being provided with a groove 180, which engages the flange 164. The latch 178 (Figs. 4 and 17 to 25 inclusive) is normally located extending through a cam slot or opening 181 provided in a releaser 182 as in the position shown in Fig. 17.

When the subtraction-setting trip 174 is rocked about its pivot, it withdraws the latch 178 from the position shown in Fig. 17 to the position shown in Fig. 19, so as to permit the releaser 182 to drop from the position shown in Fig. 17 to the position shown in Fig. 19, where it rests on the top of one of the side bars of the general operator 75. The releaser 182 is then in a position to drop further to the position shown in Fig. 21 under the traction of its spring 183, on a subsequent forward movement of the general operator 75, as indicated in Fig. 21.

On a return movement of the general operator, the rear end of one of the side bars 184 thereof will engage a hook shoulder 185 provided on the releaser 182, so as to force the same rearwardly against the tension of the spring 183 to the position shown in Fig. 22, whereby a latch 186 pivotally connected to the releaser 182, at 187, and pivotally mounted at 188, will be swung to the Fig. 22 position, so that a locking shoulder 189 thereon will be withdrawn from the path of movement of a shoulder 190 on a cam 191. The cam 191 is secured rigidly to a shaft 192 (Figs. 4 and 15), to which is also secured one end of an auxiliary spring motor 193, which is normally under a tension tending to rotate the shaft 192 in the direction of the arrow shown in Fig. 22. Incidentally, the other end of the spring motor 193 is secured to a casing 194, which may be held in any adjusted position to vary the tension on the spring motor by means of one or more set screws 195 mounted on a fixed portion of the frame, which may engage in any one of a plurality of notches 196 provided in the casing 194.

It will thus be seen that when the latch 186 is moved to its releasing position, the spring motor 193 will be free to act and give the shaft 192 a rotation, the extent of which is determined by an arm 197 coming into engagement with a fixed stop 198. The stopping position of the shaft is shown in Fig. 24, while an intermediate position during the rotation of the shaft after having been released as at Fig. 22, is shown in Fig. 23.

The purpose of rotating the shaft 192 is to draw the subtraction key 47 and its bar 49 rearwardly against the tension of the spring 48, to set the subtraction mechanism. To do this, the shaft 192 has formed thereon, a spiral cam 199, which is arranged to engage a cam follower or roller 200, connected to the subtraction bar 49. It will readily be seen by reference to Fig. 4, that when the shaft 192 rotates in the direction of the arrow shown in Figs. 4, 22 and 23, it will force the subtraction bar 49 rearwardly from the position shown in Fig. 4 to the position shown in Fig. 14, which latter position is almost at the end of the rotation of the shaft 192, so as to effect the various actions necessary for a subtraction by the complementary method, such as shifting the rock shafts 39 from their adding-pin-setting position to their subtracting-pin-setting position, and, further, raising all of the pin-bars by the universal frame 69 and setting all of the "9" pins when the bars are so raised by the universal frame 72.

It will be noted that the cam 199 has an abrupt dip from its highest to its lowest point, which is found necessary in case it should be desired to correct an error by an actuation of the error key 151, so as to permit the return of the subtraction key and its bar 49 to unset position. To provide then for a contrary rotation of the shaft 192, the follower 200 is mounted on an arm 201, which is held normally in the position shown in Fig. 4, by a spring 202, but is free to move against the tension of the spring to admit of the counter-rotation of the cam 199 past the follower 200. The arm 201 is mounted on an extension of the subtraction bar 49, which extension is hook-formed to encompass the shaft 192 and be guided thereby. A stop 203 (Fig. 16) may be provided to engage an offset 204 on the arm 201, so as to prevent a backward movement of the arm 201 during a camming action while admitting of the escapement of the arm 201 during a counter-rotation of the cam 199 and the shaft 192.

It will be noted that as soon as the shaft 192 starts any rotation, the latch 186 will be cammed out by a cam surface 204a on the cam 191, so that the releaser 182 is forced from its Fig. 22 position to its Fig. 23 position, whereby the left-hand end of the cam-opening 181, which is higher than the remainder thereof, will come into register with the latch 178. The latch 178 is thereby free to return from its releasing position shown in Fig. 22 to its locking position shown in Fig. 23, under the tension of a spring 205, which engages the bail bell-crank lever 176 (Fig. 17).

It will be seen that in this position, the releaser 182 is held free and clear of the general operator side bar 184, so that if it is desired to again subtract, the latch 178 would just play back and forth in the cam-opening 181 without altering the position of the releaser 182. This, however, is taken care of by providing a dip or slump 206 in the cam 191, so that when the cam completes its revolution with the shaft 192, that is, when it occupies the position shown in Fig. 24, the latch 186 will be drawn into this dip by the spring 183, thereby raising the releaser 182 from the Fig. 23 position to the Fig. 24 position, by virtue of the upper edge 207 of the cam slot 181 being inclined and engaging the top edge of the latch 186. Now, then, when the parts occupy this position, as shown in Fig. 24, if the trip 174 should be again actuated by one of the tappets or stops 18, the releaser 182 would again be in a position to drop to the Fig. 19 position or approximately the same, and the latch 178 would be prevented from reëntering the slot 181 until after a subsequent actuation of the general operator.

It is necessary to retension the spring 193 after it has performed an operation, so that it will be ready to act once more when it is desired to carry out a subsequent subtracting operation. For this purpose, the side bar 184 of the general operator 75 is provided with a rack 208, which meshes with a gear 209 driving a gear 210, which in turn meshes with a gear 211 loosely mounted on the shaft 192. The shaft 192, however, may be clutched to the gear 211, so as to be rotated thereby to rewind the spring motor 193 during a forward motion of the general operator subsequent to the one which released the latch 186 and permitted a rotation of the shaft 192 under the propulsion of the spring motor 193. For this purpose, the gear 211 is provided with a clutch socket 212, into which is adapted to enter a clutch element 213, normally held in a receded position against the tension of a spring 214 in a socket 215 provided in the shaft 192.

Under normal conditions when the device is used solely for adding, the general operator may be reciprocated freely without bringing about a clutching connection between the gear 211 and the shaft 192. That is to say, the gear 211 does not make a complete revolution, so that it can rotate in the direction of the arrow (Fig. 19) the full extent of its rotation without overtaking the clutch element 213, which will be located in the Fig. 17 position. But, on the other hand, if the shaft 192 has been released and permitted to rotate until the arm 197 is stopped by coming into engagement with the fixed stop or obstruction 198, so that the parts occupy the position shown in Fig. 24, then the clutch element 213 is forced out by its spring so as to occupy a position in the socket 212, such as shown in Fig. 24.

If, now, during a forward movement of the general operator 75, the gears 209, 210 and 211 are rotated, as shown in Fig. 25, then the gear 211 will carry with it the shaft 192 in the reverse direction, so that the spring motor 193 will be rewound and brought to the normal position shown in Fig. 21, where the latch 186 is free to come in and catch the cam 191, and thus hold the shaft 192 in its home or rest position. During a subsequent return movement of the general operator 75, the gear 211 will rotate counter-clockwise camming the clutch element 213 back into its socket 215, so that the shaft 192 will remain stationary while the gear 211 returns to its normal rest position.

It will be noted in passing that the trips 157 and 174 are formed so that while they will be actuated during a step-by-step movement of the carriage in a normal letter-feeding direction, they will permit the passage of the tappets 18 freely on a return movement of the carriage (Figs. 4 and 7 to 9 inclusive). For this purpose, each trip includes a pair of side plates 216 and 217, between which is pivotally mounted a pawl 218 having an upstanding tooth 219 to be engaged by the tappets 18. The bottom of the pawl 218 is formed with a right-angle corner 220, into engagement with which is arranged a spring 221 having a V-bend, which will permit a movement of the pawl 218 in either direction. The movement of the pawl 218, however, is limited in one direction by a stop 222 shown in the form of an adjustably-mounted screw having a nut 223 to lock it in any position of adjustment, whereby the extent of return movement and the exact position of the pawl 218 may be determined. The stop 222 prevents the retreat of the pawl 218 before an oncoming tappet 18 when the carriage is moving in a letter-feeding direction, so that the pawl forms a positive connection between the tappet and the trip enabling a rocking of the trip. On the other hand, when the carriage returns the tappet will rock the pawl about its pivot against the tension of the spring 221, so that the trip itself will remain passive.

It will be noted at this point, that all of the tappets 18 are not intended to actuate both of the trips 157 and 174, and, in fact, some of the tappets 18 may not be used to operate either of the trips, and in such a case are used solely for the purpose of coöperating with the plungers 17 to determine the position of the carriage 7. A tappet 18 which determines solely the position of the carriage 7 is of the form shown in Fig. 12. If it is desired to have a tappet which will actuate solely in the trip 157, it may be of the form shown in Fig. 10, so that it will not extend far enough rearwardly to engage the outer trip 174. That is to say, its lower edge is cut away, so that it projects solely to a position capable of rocking the inner trip 157. Such a tappet controls merely the connection of the motor to the general operator, so as to cause a complete cycle of operations thereof, and may be termed the motor tappet. If, on the other hand, it is desired to have a tappet 18 which will not only actuate the inner trip 157 but will also actuate the outer trip 174, so as to set up a condition enabling a subsequent subtracting operation, then the tappet will be of the form shown in Fig. 11, with the bottom edge thereof extending rearwardly far enough to engage the farther or rearmost trip 174.

In view of the fact that the tappets 18 may fit somewhat loosely on the rack 19, provision is made so that when once adjusted home on the rack 19, they will be prevented from wabbling and will positively actuate the trips 157 and 174 their full amounts. For this purpose, each of the trip-actuating tappets 18 is provided with an upstanding toe or extension 224, which engages a bar 225 extending parallel to the rack 19 and above the same. This bar when engaged by one of the toes 224 will steady the tappet and form thereof a substantially rigid camming member.

If, for any reason, it should be undesirable to control the setting for subtraction from the carriage, this mechanism can be rendered ineffective, as will be seen by reference to Fig. 17, by rocking a hand lever 226 to the position shown in dotted lines in this figure, so that a locking toe 227 thereon will project beneath an overhang or flange 228 on the latch-releaser 182. This, then, will prevent the latch-releaser 182 from dropping when the latch 178 is withdrawn to its releasing position. Under such circumstances, of course, the general operator 75 will be powerless to release the latch. Hence the shaft 192 cannot rotate so that there will be no automatic setting for subtraction, even though a subtraction tappet 18 should happen to rock the subtraction-setting trip 174.

In the operation of the device, tappets of the form shown in Fig. 12 are placed on the rack 19 at points where it is merely desired, through the coöperation of the tabulating plungers 17, to position the carriage. Where it is desired to connect up the motor to the general operator to cause a number previously accumulated by the setting up of the pins 26 to be run up on the computing wheels 31, then a tappet 18 of the form shown in Fig. 10 is set in proper position on the rack 19, so that it will come into engagement with the trip 157 just after the last digit of a number has been accumulated, and, at the same time, written on the work-sheet on the platen.

If it is desired to subtract in a subsequent column, then a tappet of the form shown in Fig. 11 is placed in such a position on the rack 19, that during the running-up of a number previously accumulated it will be in a position to set up a condition corresponding to the subsequent accumulation according to the subtraction of a number in the next computing zone or column.

When the tappets are thus properly set, so as to automatically give a predetermined sequence of computing actions, then the carriage may be brought to the first computing zone or column and the numeral keys 1 actuated not only to strike the numbers on the work-sheet but also to actuate the pin-setting mechanism 25, so as to set up the pins 26 on the rack bars 27, to correspond with the numeral keys struck. The rack bars 27 are raised one by one in succession commencing with the highest denomination and proceeding to the lowest, so that the numerals exhibited on the work-sheet will accord with the numerals accumulated on the denominational rack bars 27.

We will assume for the purpose of illustration, that the first two columns or computing zones are adding zones and the third a subtracting zone. Hence, a tappet of the form shown in Fig. 10 will come into play just after the last digit of a number in the first column has been set up in the computing mechanism and recorded on the worksheet. This tappet 18 will engage solely the inner trip 157, so as to rock the same and thereby withdraw the latch 162 from its position projecting above the lever 166, permitting the spring 167 to throw up this end of the lever and depress the opposite end, whereby the thrust rod 169 is forced downwardly to rock the lever 111 and withdraw the stop pin 113 from its position engaging with the projection 117 on the clutch shifter 118. This permits the spring 119 to expand forcing the friction roller 120 into the narrow passage or shallow portion of the socket 123, so that it forms a positive connection between the sleeve 121 and the hub 122. Under these conditions the electric motor 124 will be connected to reciprocate the arm 133 and thus give the general operator 75 one complete cycle of operations including a back-and-forth reciprocation.

During the forward motion of the general operator, the cross bar 74 thereof will, as usual, engage all of the set pins 26 on the several rack bars 27, thereby rotating the computing wheels 30 amounts corresponding to the particular pins set up. The rearward motion of the rack bars 27 on the return of the general operator is, as usual, idle, there being provided between the gears 29 and the computing wheels 30, the customary one-way clutch or pawl-and-ratchet connection, not shown. On the complete return of the general operator, the set-up pins will be restored by the pin-restoring plate 147, thereby returning all of the parts to their normal position ready for another computation. The numeral keys are again struck to accumulate the second number in the new computing zone, which number, as stated above, is also one to be added. After this number has been completely written on the worksheet and accumulated by the setting-up of the pins 26, then another tappet 18 will come into play.

Now, inasmuch as we have stated that we will subtract in the third computing column or zone, in this type of machine it is necessary to anticipate such subtracting action and to set up a condition in the mechanism such that a subtracting computation may take place in the next computing zone or column. Hence, at this point the particular tappet 18 which will come into play, is of the type shown in Fig. 11, and will not only actuate the motor trip 157 but will also actuate the subtraction-setting trip 174. As illustrated, the subtraction-setting trip 174 has its tooth 219 on the pawl 218 set slightly in advance of the corresponding tooth on the trip 157, so as to insure the setting-up of a subtracting condition before the general operator starts into motion. As soon as the tappet 18 of the form shown in Fig. 11 comes into engagement with the tooth 219 of the subtraction-setting trip 174, it will rock the same, so as to actuate the connected linkage and withdraw the latch 178 from its position supporting the latch-releaser 182 in its raised position. That is to say, under normal conditions, the latch 178 is, as shown in Fig. 17, holding the latch-releaser 182 in its raised position. When this latch 178 is withdrawn, however, it permits the latch-releaser 182 to fall to the position shown in Fig. 19, where it rests on top of the general operator 75.

During a further movement of the carriage, the same tappet 18 comes into engagement with the motor trip 157, so as to rock the same and remove the latch 162 from engagement with the lever 166, permitting as before a complete cycle of movements of the general operator 75 under the propulsion of the motor 124. The general operator will then start forward in the direction of the arrow shown in Fig. 19 and continue on to the position shown in Fig. 21, thereby permitting the latch-releaser 182 to drop down into the position shown in Fig. 21. It will be seen that in this position, the latch 178 is obstructed by the body of the latch-releaser 182 and cannot at this time reënter the slot 181.

The general operator during its forward and rearward motion will run up on the computing wheels 30, the number accumulated for the second computing zone or column, and on its return motion will re-set all of the parts to normal position ready for a subsequent computing action. Before, however, the general operator has entirely completed its return motion, the rear corner on one of the side bars 184 will come into engagement with the hook shoulder 185 of the latch-releaser 182, drawing it rearwardly against the tension of the spring 183, so as to pull the latch 186 out of engagement with the shoulder 190 (Fig. 22), thereby permitting the spring motor 193, which all this time has been under tension, to act. This spring motor will give a rotation to the shaft 192, so that it will rotate from the position shown in Fig. 22, through the position shown in Fig. 23, to the position shown in Fig. 24, carrying the parts fixed thereon with it.

During this action, one of the first things which occurs is that the latch 186 is cammed farther away from the shaft 192 and thereby slides the latch-releaser 182 to the position shown in Fig. 23, permitting the latch 178 to return to its position in the slot 181, the tappet 18 having in the meantime passed beyond the trip 174.

As the shaft 192 rotates, it carries around the cam 199, so that the latter engaging the cam follower 200 gradually forces the subtraction rod 49 and the key 27 rearwardly against the tension of the spring 48. As this occurs, the bell-crank, comprising the arm 51, the shaft 52 and the arm 53, is rocked to rock the shifter bar 56, thereby forcing the rock shafts 39 forward from their Fig. 30 position to their Fig. 14 position, whereby the subtraction arms $1^S$, $2^S$, $3^S$, $4^S$, $5^{AS}$, $6^S$, $7^S$ and $8^S$ (Fig. 31), will be connected up with the wrist pins $1^P$, $2^P$, $3^P$, $4^P$, $5^P$, $6^P$, $7^P$, and $8^P$, respectively, on the links $8^L$, $7^L$, $6^L$, $5^L$, $4^L$, $3^L$, $2^L$ and $1^L$, to enable a setting of the complementary pins on the next accumulation of a number.

In addition to this shifting of the pin-setting mechanism from its according setting to its setting of numbers corresponding to the complement of the keys struck, all of the "9" pins are set up at this time. For this purpose, the extension 63 is carried rearwardly with the subtraction bar 49 engaging the knuckle of the toggle 64, spreading the same from the position shown in Figs. 1 and 4, to the position shown in Fig. 14, whereby the universal frame 69 will be rocked upwardly so as to lift all of the pin-bearing rack bars 27, and, at the same time, the universal frame 72 will be rocked downwardly at its front end, to rock all of the "9" pin levers 59 downwardly at their front ends. Thus the "9" pins are moved from the dotted line position shown in Fig. 14, to the full line position shown in Fig. 14 corresponding to the setting-up of the these "9" pins. The universal frame 72 at the same time engages the finger 85 on the trigger 83, so as to force the shoulder 84 downwardly into the path of the general operator cross bar 74, whereby on the subsequent movement of the general operator, this trigger 83 and the supernumerary bar 81 on which it is mounted, will be given a motion equivalent to the full stroke motion of the general operator, but one step in advance of any possible movement of the pin-bars 27.

On the continued rearward motion of the subtraction rod 49 under the action of the cam 199 on the shaft 192, the latch arm 99 will engage the stop 100, so as to disengage the toe thereof from the shoulder 98 on the slide 94, which carries the toggle-actuating projection 63. This will enable the spring 73 to collapse the toggle 64, forcing the slide 94 into the position shown in Fig. 2, whereby the universal frames 69 and 72 will be returned to their normal positions leaving all of the "9" pins and the trigger on the supernumerary bar set up. When the subtraction bar 49 reaches the end of its rearward motion, the dog 93 engages the notch $94^a$ and holds the subtraction bar in its set position until subsequently released.

We have, then, not only run up the digits of the number in the second computing zone or column on the computing wheels, but when finished we have released the auxiliary motor 193 to enable it to automatically set the mechanism for a subsequent subtracting operation in the next column. That is to say, we have changed the pin-setting mechansim 25 from its normal position to a condition such that it will set up complements, and we have set up the "9" pins as well as the trigger on the supplementary bar 81, to give an added step movement to the units or cents wheel. The carriage 7 is then moved on to the next or third computing zone or column under the assumption given, and the numeral keys 1 are once more struck to print the digits of a number to be subtracted at the same time setting up the pins 26 according to the complements of the numeral keys actuated and not according to their direct value. As a numeral key is actuated in any particular column, it will not only set up the pin corresponding to the complement thereof, but it will also actuate the "9" pin-restoring linkage 46, so that the same bar 27 which is raised to have a pin set up thereon, will have its "9" pin lever 59 engaged at its rear end, as indicated in Figs. 33 and 35, to unset the "9" pin concomitantly with the setting-up of another pin.

After the entire number to be subtracted has been written on the work-sheet and the complements of the digits accumulated by the setting up of the pins 26, then the mechanism is in condition to have the computing wheels 30 rotated to subtract the number printed on the work-sheet from the number already exhibited by the computing wheels. To bring about this automatically, a tappet 18 of either of the types shown in Figs. 10 or 11, according to whether in the next column it is desired to add or subtract, respectively, is placed so that after the number to be subtracted is printed and accumulated, it will come into play to rock one or both of the trips 157 and 174, according to whether it is desired in the next or fourth computing zone or column, to add or subtract, respectively. That is to say, if in the next computing zone or column it is desired to add, a tappet of the type shown in Fig. 10 will come into engagement with the trip 157 to rock the same to remove the latch 162 to its released position, permitting the removal of the pin 113 to its non-obstructing position, and thus permitting one complete cycle of movements of the general operator under the propulsion of the electric motor 124.

During the forward movement of the general operator, the cross bar 74 thereof will first engage the downwardly-extending shoulder 84 and will gradually overtake the set-up pins 26 on the other rack bars with the exception of the units or cents rack bar. In the case of the units or cents rack bar, the cut-out portion 79, which is carried by the supernumerary bar 81, will engage whatever pin happens to be set up on the units or cents rack bar, one step in advance of the engagement of corresponding pins on the other rack bars, by the forward edge 77 of the general operator cross bar 74. This, then, will give to the computing wheels 30, forward rotations corresponding to the pins set up thereon, with the exception of the units or cents wheel which is given one step further, and inasmuch as these pins correspond to the complements of the numbers which it is desired to subtract, the action is the same as if the computing wheels had actually had these numbers subtracted therefrom by a counter-rotation. During the movement of the general operator 75, the cam head 137 will be cammed out of the socket 136, so as to cause the arm 139 to release the dog 93 from engagement with the notch 94ª in the subtraction bar 49, allowing the spring 48 to return it to its normal position.

During the forward motion of the general operator in running up this subtraction, the spring motor 193 is retensioned. To accomplish this, the gears 209, 210 and 211 are rotated in the direction of the arrow shown in Fig. 25, so that the shoulder of the clutch socket 212, which occupies the position shown in Fig. 24, will engage the clutch element 213 and carry the shaft 192 around as indicated in Fig. 25, until it reaches the normal position shown in Fig. 21, when the latch 186 will engage the shoulder of the cam 191 and hold the shaft 192 in its normal position with the spring motor 193 fully tensioned.

It is to be noted at this point that the only time that the shoulder of the socket 212 will engage the clutch element 213 to rotate the shaft 192 and thus retension the spring motor 193, is after the spring motor has acted to revolve the shaft 192 and connected parts to a position such that the arm 197 is brought up against the fixed stop 198. That is to say, the clutch connections between the gear 211 and the shaft 192 will only be in their effective relation when the spring motor has acted and thus needs retensioning. At all other times, the gear 211 will oscillate back and forth with the clutch element 213 in the position shown in Fig. 22 without driving the same.

It is to be understood when the shaft 192 is rotated in the reverse direction to retension the spring motor 193, that the cam 191 will rotate backwardly with the same until the latch 186 drops into engagement with the shoulder 190 to lock the shaft against movement owing to the tension of the spring motor. When this occurs, the spring 183 pulls the latch-releaser 182 to the left, so that the top edge 207 of the cam slot or opening 181 engaging the top edge of the latch 178 will force the latch-releaser 182 up to its normal raised position, as illustrated in Fig. 17.

During the return movement of the general operator, the set-up pins are restored to their normal position and all parts rearranged for the next computing operation.

If in place of adding in the fourth column it was desired to subtract, then a tappet of the type shown in Fig. 11 would have been used to cause the running up of the previous computation belonging to the third column or computing zone.

As has been stated above, the latch 178 in the meantime has returned to its position in the slot 181. In addition to this, the latch 186 has settled in the slump 206 on the cam 191, so that the latch-releaser or disconnector 182 is cammed up into the position shown in Fig. 24. If the latch 178 is withdrawn at this time by a subtraction-setting tappet, then the latch-releaser 182 is in a position to fall down in front of the latch 178, so as to prevent the return of the same and also so that the hook shoulder on the latch-releaser will be located once more in the path of the general operator side bar 184, whereby on the return movement of the latter, the spring motor 193 will be again released to set up a new subtracting condition. It will be seen that this is possible in view of the fact that the spring motor 193 has been rewound during the forward motion of the general operator and that the releasing takes place at the end of the return motion of the general operator.

The number of computing columns depends upon the length of the carriage, and the character of operation of the different computing columns or zones can be determined by the tappets 18, one type being used when it is merely desired to run up a number accumulated and another type being used when it is desired not only to run up a number just accumulated but to set the machine for a subsequent subtracting operation for the next accumulated number. Of course, this operation can be repeated over and over again for each new line of writing, automatically determining whether the machine shall add or subtract the numbers printed in the different computing columns or zones.

Variations may be resorted to within the scope of the invention, and portions of the improvements may be used without others.

Having thus described my invention, I claim:

1. The combination with a traveling carriage, of tappets or stops mounted on said carriage, tabulating mechanism coöperating with said stops to control the position of said carriage, computation-accumulating mechanism including key-controlled digit-setting means, a general operator for computing the number after all the digits thereof are set up, a source of power for driving said general operator, a normally-interrupted train of connections between said source of power and said general operator, and means actuated by said stops for controlling the completion of said train of connections between said source of power and said general operator, and thereby controlling the driving of said general operator by said source of power.

2. The combination with a traveling carriage, of one or more tappets or stops mounted on said carriage, tabulating mechanism coöperating with said stops to determine the position of said carriage, computation-accumulating mechanism including key-controlled digit-setting means, a general operator for computing the number after all the digits thereof are set up, a latch controlling the action of said general operator, and a trip operable by said stops for controlling said latch.

3. In a combined typewriting and computing machine having a carriage and computing mechanism, the combination with a general operator for said computing mechanism, of a source of power, a train of gearing between said source of power and said general operator including a clutch, a pin for controlling the effectiveness of said clutch, a lever for operating said pin, a thrust link riding on said lever and having a lug projecting from one side thereof, a second lever engaging said lug, a latch for said second lever, means controlled by said carriage for releasing said latch, and means to enable said general operator to restore said second lever.

4. In a combined typewriting and computing machine having a carriage and computing mechanism, the combination with a general operator for said computing mechanism, of a source of power, a lever for controlling the drive of said general operator by said source of power, a spring normally tending to actuate said lever, a latch tending to prevent the actuation of said lever by said spring, and means controlled by said carriage for tripping said latch.

5. In a combined typewriting and computing machine having a carriage and computing mechanism, the combination with a general operator for said computing mechanism, of a source of power, a lever for controlling the drive of said general operator by said source of power, a spring normally tending to actuate said lever, a latch tending to prevent the actuation of said lever by said spring, means controlled by said carriage for tripping said latch, a cam on said general operator, and an extension on said lever engaging said cam during a movement initiated by the movement of said lever under the pull of said spring acting to retension said spring and set said lever for a future operation.

6. In a combined typewriting and computing machine having a carriage and computing mechanism, the combination with a general operator for said computing mechanism, of a source of power, a lever for controlling the drive of said general operator by said source of power, a second lever contacting with said first lever to operate the same, a key for operating said second lever, a thrust link contacting with the first lever to operate the same, a third lever coöperating with said thrust link for operating the first lever, means controlled by said carriage for operating said third lever, and means connected with said general operator for restoring said third lever to normal position.

7. The combination with a gang-driven computing mechanism, including numeral keys and means to enable the keys to set up digits preparatory to effecting a computation, of a source of power for driving said computing mechanism, manual means for controlling the drive of said computing mechanism by said source of power, a carriage, a tappet or stop carried by said carriage, a tabulating mechanism coöperating with said stop to control the position of said carriage, and automatic means operated by said stop and effective after the completion of the setting up of a series of digits by the keys, for controlling a gang drive of said computing mechanism by said source of power, to compute simultaneously the digits so set up.

8. The combination with a gang-driven computing mechanism, including numeral keys and means to enable the keys to set up digits preparatory to effecting a computation, of a source of power for driving said computing mechanism, a traveling carriage, one or more tappets or stops on said carriage, a tabulating mechanism coöperating with said stops to control the position of said carriage, and automatic means actuable by any of said stops and effective after the completion of the setting up of a series of digits by the keys, during the travel of said carriage for automatically causing a gang drive of said computing mechanism by said source of power, to compute simultaneously the digits so set up.

9. In a computing machine capable of performing subtraction, a subtraction-setting mechanism including parts having conjunctive opposite movements to set up a subtracting condition, a toggle for effecting said movements, and means for actuating said toggle.

10. In a computing machine capable of performing subtraction, a subtraction-setting mechanism including parts having conjunctive opposite movements to set up a subtracting condition, a toggle for effecting said movements, a subtraction rod, and an extension connected to said subtraction rod for manipulating said toggle to effect said movements.

11. In a computing machine capable of performing subtraction, a subtraction-setting mechanism including two parts having relative coöperating conjunctive movements to set up a subtracting condition, and a toggle joined to both of said parts for concomitantly effecting the required movements.

12. In a computing machine capable of performing subtraction, subtraction-setting mechanism including parts having relative coöperating conjunctive movements to set up a subtracting condition, a toggle joined to said parts for concomitantly effecting the required movements, means for momentarily actuating said toggle, and means for returning said toggle to its normal position.

13. In a computing machine capable of performing subtraction, a subtraction-setting mechanism including parts having relative coöperating conjunctive movements to set up a subtracting condition, a toggle joined to said parts for concomitantly effecting the required movements, a spring normally holding said toggle in a collapsed condition, and means for spreading said toggle against the tension of said spring.

14. In a computing machine capable of performing subtraction, a subtraction-setting mechanism including parts having relative coöperating conjunctive movements to set up a subtracting condition, a toggle joined to said parts for concomitantly effecting the required movements, a spring for normally holding said toggle in a collapsed condition, means abutting against said toggle at the knuckle thereof to spread said toggle against the tension of said spring, and releasing means for said last-mentioned means effective after said toggle has completed its work to permit said spring to return said toggle to its normally collapsed condition.

15. In a computing machine capable of performing subtraction, a subtraction-setting mechanism including parts having relative coöperating conjunctive movements to set up a subtracting condition, a toggle joined to said parts for concomitantly effecting the required movements, a subtraction rod, and means connected to said subtraction rod and engaging said toggle to spread the same.

16. In a computing machine capable of performing subtraction, a subtraction-setting mechanism including parts having relative coöperating conjunctive movements to set up a subtracting condition, a toggle joined to said parts for concomitantly effecting the required movements, a subtraction rod, an extension on said subtraction rod engaging said toggle to manipulate the same, said extension being movable relatively to said subtraction rod, a latch holding said extension fixed relatively to said subtraction rod, and means for releasing said latch after said toggle has completed its work.

17. In a computing machine capable of performing subtraction, a subtraction-setting mechanism including parts having relative coöperating conjunctive movements to set up a subtracting condition, a toggle joined to said parts for concomitantly effecting the required movements, a subtraction rod, an extension on said subtraction rod engaging said toggle to manipulate the same, said extension being movable relatively to said subtraction rod, a latch holding said extension fixed relatively to said subtraction rod, means for releasing said latch after said toggle has completed its work, and means for returning said toggle and the parts connected thereto to their normal condition when said latch is released.

18. In a computing machine capable of performing subtraction, a subtraction-setting mechanism including parts having relative coöperating conjunctive movements to set up a subtraction condition, a toggle joined to said parts for concomitantly effecting the required movements, a spring for holding said toggle in a normal condition, a subtraction rod, an extension on said subtraction rod engaging said toggle to manipulate the same against the tension of said spring, said extension being movable relatively to said subtraction rod, a latch for holding said extension fixed relatively to said subtraction rod, and means for releasing said latch to permit the action of said spring on said toggle and a movement of said extension along said subtraction rod after said toggle and the parts connected thereto have completed their work.

19. In a computing machine capable of performing subtraction, a subtraction-setting mechanism including parts having relative coöperating conjunctive movements to set up a subtraction condition, a toggle joined to said parts for concomitantly effecting the required movements, a subtraction rod, a slide on said subtraction rod being moved relatively thereto and having an extension arranged to engage said toggle to manipulate the same, a latch for holding said slide fixed on said subtraction rod, and an adjustable stop for tripping said latch.

20. In a computing machine capable of performing subtraction, means for setting up a subtracting condition, a subtraction rod, a slide movably mounted on said rod, an extension on said slide engaging said means to operate the same, and means for determining the relative position of said slide and said subtraction rod.

21. In a computing machine capable of performing subtraction, means for setting up a subtracting condition, a subtraction rod, a slide movably mounted on said subtraction rod, said slide having means to actuate said first-mentioned means, and a latch for locking said slide in a definite position on said subtraction rod.

22. In a computing machine capable of performing subtraction, means for setting up a subtracting condition, a subtraction rod, a member movable relatively to said rod arranged to actuate said means, and a latch for holding said member fixed relatively to said rod.

23. In a computing machine capable of performing subtraction, means for setting up a subtracting condition, a subtraction rod, a member movable relatively to said rod arranged to actuate said means, a latch for holding said member fixed relatively to said rod, and means for tripping said latch.

24. In a computing machine capable of performing subtraction, means for setting up a subtracting condition, a subtraction rod having a movement to effect an actuation of said means, a member movable on said rod, a latch for preventing a movement of said member on said rod, said member acting when fixed relatively to said rod to actuate said means, and means for tripping said latch to release said member.

25. The combination with a computation-accumulating means including settable members from the lowest to the highest ultimate value and supports for said members, means for setting certain of said members acting by coöperating conjunctive movements, a toggle for effecting said conjunctive movements, and means for actuating said toggle.

26. In a computing machine, the combination with a series of bars, of a series of pins on each of said bars settable to determine the extent of movement of said bars, said pins ranging from those corresponding to smallest movements of said bars to those corresponding to greatest movements of said bars, means for setting the pins on each of the bars corresponding to the greatest movements of their associated bars, means for lifting all of the bars to have said last-mentioned pins set, and a toggle for concomitantly actuating both of said last-mentioned means.

27. In a computing machine, the combination with a series of bars, of a series of pins on each of said bars ranging from lowest value to highest ultimate value, a frame universal to all of said pins of highest ultimate value, a frame universal to all of said bars, and a toggle for concomitantly actuating both of said universal frames to effect a setting of said pins of highest ultimate value.

28. In a computing machine, the combination with a series of bars, of a series of pins on each of said bars ranging from lowest value to highest ultimate value, a frame universal to all of said pins of highest ultimate value, a frame universal to all of said bars, a toggle for concomitantly actuating both of said universal frames to effect a setting of said pins of highest ultimate value, a subtraction rod, and means operable thereby to actuate the toggle.

29. In a computing machine, the combination with a series of bars, of a series of pins on each of said bars ranging from lowest value to highest ultimate value, a frame universal to all of said pins of highest ultimate value, a frame universal to all of said bars, a toggle for concomitantly actuating both of said universal frames to effect a setting of said pins of highest ultimate value, means for normally holding said toggle in a certain position corresponding to the inactivity of said universal frames, a subtraction rod, and an extension on said subtraction rod for opposing said means so as to manipulate said toggle.

30. In a computing machine, the combination with a series of bars, of a series of pins on each of said bars ranging from lowest value to highest ultimate value, a frame universal to all of said pins of highest ultimate value, a frame universal to all of said bars, a toggle for concomitantly actuating both of said universal frames to effect a setting of said pins of highest ultimate value, means for normally holding said toggle in a certain position corresponding to the inactivity of said universal frames, a subtraction rod, an extension on said subtraction rod for opposing said means so as to manipulate said toggle, said extension being movable relatively to said subtraction rod, and means for determining whether said extension shall remain fixed on said subtraction rod or have a movement relative to said subtraction rod.

31. In a computing machine, the combination with a series of bars, of a series of pins on each of said bars ranging from lowest value to highest ultimate value, a frame universal to all of said pins of highest ultimate value, a frame universal to all of said bars, a toggle for concomitantly actuating both of said universal frames to effect a setting of said pins of highest ultimate value, means for normally holding said toggle in a certain position corresponding to the inactivity of said universal frames, a subtraction rod, an extension on said subtraction rod for opposing said means so as to manipulate said toggle, said extension being movable relatively to said subtraction rod, a latch for preventing the movement of said extension relatively to said subtraction rod, and a trip for said latch effective when said toggle has completed its work to release said latch and permit said toggle and the parts connected thereto to return to their normal condition.

32. In a computing machine, the combination with a series of bars, of a series of pins on each of said bars ranging from lowest value to highest ultimate value, a frame universal to all of said pins of highest ultimate value, a frame universal to all of said bars, a toggle for concomitantly actuating both of said universal frames to effect a setting of said pins of highest ultimate value, a subtraction rod, a slide adjustable along said subtraction rod and having an extension arranged to engage said toggle to manipulate the same, a latch for preventing a movement of said slide along said subtraction rod, and a trip for releasing said latch during a movement of said subtraction rod.

33. In a computing machine capable for performing subtraction, means for setting up a subtracting condition, a subtraction rod, a slide on said subtraction rod arranged to actuate said means, said slide being movable relatively to said rod, and means for returning said slide to a normal position on said rod.

34. In a computing machine capable of performing subtraction, subtraction-setting means, a subtraction rod, a member movable relatively to said rod and arranged to engage said means to actuate the same, said member having a movement relative to said rod when said rod moves in one direction, and means for returning said member to its normal position when said rod moves in the opposite direction to return to its normal position.

35. In a computing machine capable of performing subtraction, means for setting up a subtracting condition, a subtraction rod, a member connected to said rod and arranged to actuate said means, said member being movable relatively to said rod, a latch for holding said member against movement relatively to said rod, means for releasing said latch after a predetermined movement of said rod, so as to permit said member to move relatively to said rod, and a projection extending into the path of said member arranged to return said member to its normal position during a subsequent return movement of said rod.

36. In a computing machine, the combination with a series of rack bars, of pins on said rack bars, levers connected to certain of said pins, means universal to all of said levers for actuating the same to set the connected pins, means universal to all of said rack bars for displacing the same to enable the setting of said pins, a toggle connected to both of said universal means to concomitantly actuate the same, and means for actuating said toggle.

37. In a computing machine, the combination with a series of rack bars, a series of pins on each of said rack bars, a series of levers connected to certain of said pins, a frame universal to all of said levers, a frame universal to all of said bars for lifting the same to enable the setting of pins connected to said levers, by engaging with said first-mentioned universal frame of said levers, a toggle connecting both of said frames for concomitantly actuating the same, a spring for holding said toggle and said frames in a normally inactive position, and means for manipulating said toggle against the tension of said spring for concomitantly shifting both of said universal frames.

38. In a computing machine, the combination with a series of rack bars, of a series of pins on said rack bars, subtracting mechanism for setting up a subtracting condition, a subtraction rod for actuating said mechanism, said rod having a notch therein, a dog engaging said notch to hold said rod in its actuated position, a pin-restoring plate, levers for actuating said plate, and a link connected to one of said levers and also connected to said dog so as to release said dog when said plate is actuated.

39. In a computing machine, the combination with a series of rack bars, of a series of pins on said rack bars, subtracting mechanism for setting up a subtracting condition, a subtraction rod for actuating said mechanism, a dog operating as a latch to hold said rod in its actuated position, a pin-restoring plate, and means to release said dog when said plate is actuated, and including a lost-motion device to admit of a rod-latching movement of said dog without a corresponding movement of said plate.

40. In a computing machine, the combination with a series of rack bars, of a series of pins settable on said rack bars, a subtraction-setting mechanism, a subtraction rod for actuating said mechanism having a notch therein, a dog engaging said notch to hold said rod in its subtraction-setting position, a trip for said dog, camming means for actuating said trip, and a general operator controlling said camming means and acting to engage said pins to reciprocate said rack bars.

41. In a computing machine capable of performing subtraction, a subtraction-setting mechanism, an auxiliary motor for said subtraction-setting mechanism, a latch for preventing the actuation of said subtraction-setting mechanism by said auxiliary motor, a general operator, and means to enable said general operator to release said latch.

42. In a computing machine capable of performing subtraction, a subtraction-setting mechanism, means for actuating said subtraction-setting mechanism, a latch for preventing the actuation of said subtraction-setting mechanism, a releaser for said latch, and a latch for preventing the action of said releaser.

43. In a computing machine capable of performing subtraction, a subtraction-setting mechanism, means for actuating said subtraction-setting mechanism, a latch for preventing the actuation of said subtraction-setting mechanism, a releaser for said latch, a latch for preventing the action of said releaser, and a trip for said second-mentioned latch.

44. In a computing machine capable of performing subtraction, a subtraction-setting mechanism, means for actuating said subtraction-setting mechanism, a latch for preventing the actuation of said subtraction-setting mechanism, a releaser for said latch, a general operator adapted to actuate said releaser to engage said latch, and means for maintaining said releaser out of the path of said general operator.

45. In a computing machine capable of performing subtraction, a traveling carriage, a subtraction-setting mechanism, means for actuating said subtraction-setting mechanism, a latch for preventing the actuation of said subtraction-setting mechanism, a releaser for said latch, a general operator arranged to actuate said releaser, a latch for holding said releaser out of the path of said general operator, a trip for said second-mentioned latch, and a tappet carried by said carriage for actuating said trip.

46. In a computing machine capable of performing subtraction, a subtraction-setting mechanism, means for preventing the actuation of said subtraction-setting mechanism, a releaser for said means, an operating member for said releaser, said releaser having a slot therein, and a latch engaging said slot to hold said releaser clear of said operating member.

47. In a computing machine capable of performing subtraction, a subtraction-setting mechanism, means for preventing the actuation of said subtraction-setting mechanism, a releaser for said means, an operating member for said releaser, said releaser having a slot therein, a latch engaging said slot to hold said releaser clear of said operating member, and means for tripping said latch to enable a movement of said releaser into the path of movement of said operating member.

48. In a computing machine capable of performing subtraction, a subtraction-setting mechanism, means for preventing the actuation of said subtraction-setting mechanism, a releaser for said means, an operating member for said releaser, said releaser having a slot therein, a latch engaging said slot to hold said releaser clear of said operating member, and means for tripping said latch to enable a movement of said releaser into the path of movement of said operating member, said releaser moving to a position obstructing the reëntrance of said latch into said slot.

49. In a computing machine capable of performing subtraction, a subtraction-setting mechanism, means for preventing the actuation of said subtraction-setting mechanism, a releaser for said means, an operating member for said releaser, said releaser having a slot therein, a latch engaging said slot to hold said releaser clear of said operating member, means for tripping said latch to enable a movement of said releaser into the path of movement of said operating member, said releaser moving to a position obstructing the reëntrance of said latch into said slot, and means for returning said releaser to the position admitting of the return of said latch into said slot after said subtraction-setting mechanism has been actuated.

50. In a computing machine capable of performing subtraction, a subtraction-setting mechanism, means for preventing the actuation of said subtraction-setting mechanism, a releaser for said means, an operating member for said releaser, said releaser having a slot therein, a latch engaging said slot to hold said releaser clear of said operating member, means for tripping said latch to enable a movement of said operating member, said releaser moving to a position obstructing the reëntrance of said latch into said slot, means for returning said releaser to the position admitting of the return of said latch into said slot after said subtraction-setting mechanism has been actuated, and means for raising said releaser subsequent to the return of said latch to such a position that if said latch is withdrawn said releaser will fall into the path of said latch preventing its return into said slot.

51. In a computing machine capable of performing subtraction, a subtraction-setting mechanism, means for preventing the actuation of said subtraction-setting mechanism, a releaser for said means, a member for actuating said releaser, said releaser being a cam slot therein, a latch engaging in said cam slot to normally hold said releaser clear of said member, and means for causing said latch and said cam slot to shift said releaser in one direction by a movement of said releaser in another direction.

52. In a computing machine capable of performing subtraction, a subtraction-setting mechanism, means for preventing the action of said subtraction-setting mechanism, a releaser pivotally connected to said means, said releaser having a cam slot therein, a member entering said cam slot to modify the movement of said releaser, and a spring for manipulating said releaser.

53. In a computing machine capable of performing subtraction, a subtraction-setting mechanism, means for preventing the action of said subtraction-setting mechanism, a releaser having a hook thereon pivotally connected to said means intermediate its ends, a member for actuating said releaser, and a spring connected to said releaser at the opposite side of the pivot, so as to draw said hook down into the path of movement of said member.

54. In a computing machine, the combination with a subtraction-setting mechanism, of means for preventing the action of said subtraction-setting mechanism, a releaser for said means, a latch for said releaser, and a trip for said latch.

55. In a computing machine, the combination with a subtraction-setting mechanism, of means for preventing the action of said subtraction-setting mechanism, a releaser for said means, a latch for said releaser, a trip for said latch, and a traveling tappet arranged to actuate said trip.

56. In a computing machine capable of performing subtraction, the combination with a traveling carriage, of a subtraction-setting mechanism, means for preventing the action of said subtraction-setting mechanism, a releaser for said means, a latch for said releaser, a trip for said latch, and one or more tappets carried by said carriage for actuating said trip during the traveling movement thereof.

57. In a computing machine capable of performing subtraction, the combination with a traveling carriage, of a subtraction-setting mechanism, means for preventing the action of said subtraction-setting mechanism, a releaser for said means, a general operator, said general operator being arranged to actuate said releaser, a latch for holding said releaser clear of said general operator, a trip for said latch, and one or more tappets carried by said carriage for actuating said trip to disengage said latch from said releaser.

58. In a computing machine capable of performing subtraction, the combination with a traveling carriage, of a subtraction-setting mechanism, means for setting said subtraction-setting mechanism from said carriage, and means for rendering said first-mentioned means ineffective.

59. In a computing machine capable of performing subtraction, the combination with a traveling carriage, of a subtraction-setting mechanism, means for preventing the action of said subtraction-setting mechanism, tripping means for said first-mentioned means actuable from said carriage, and means for preventing the effective operation of said tripping means.

60. In a computing machine capable of performing subtraction, the combination with a traveling carriage, a subtraction-setting mechanism, means for preventing the action of said subtraction-setting mechanism, a releaser for said means, a latch for preventing the action of said releaser, a trip operated from said carriage for said latch, and means independent of said latch for holding said releaser in an ineffective position.

61. In a computing machine capable of performing subtraction, the combination with a traveling carriage, of a subtraction-setting mechanism, means for preventing the action of said subtraction-setting mechanism, a releaser for said means, a latch for preventing the action of said releaser, a trip operated from said carriage for said latch, and controlling means for governing the action of said releaser independent of said trip.

62. In a computing machine having a carriage, the combination with subtraction-setting mechanism, of means for preventing the action of said subtraction-setting mechanism, and a releaser controllable either by said carriage or manually for releasing said preventing means; a carriage-controlled latch being provided for said releaser, and said releaser being manually controllable independently of said carriage.

63. In a computing machine capable of performing subtraction, a subtraction-setting mechanism, a motor for actuating said subtraction-setting mechanism, a shaft connected to said motor, a disk connected to said shaft having a locking shoulder thereon, and a latch engaging said shoulder to prevent the rotation of said shaft and said motor.

64. In a computing machine having a carriage, the combination of a subtraction-setting mechanism, a motor for actuating said subtraction-setting mechanism, a shaft connected to said motor, a disk connected to said shaft having a locking shoulder thereon, a latch engaging said shoulder to prevent the rotation of said shaft and said motor, and means controllable by said carriage for releasing said latch.

65. In a computing machine capable of performing subtraction, a subtraction-setting mechanism, a motor for actuating said subtraction-setting mechanism, a shaft connected to said motor, a disk connected to said shaft having a locking shoulder thereon, a latch engaging said shoulder to prevent the rotation of said shaft and said motor, a releaser for said latch, and a general operator arranged to actuate said releaser.

66. In a computing machine capable of performing subtraction, a subtraction-setting mechanism, a motor for actuating said subtraction-setting mechanism, a shaft connected to said motor, a disk connected to said shaft having a locking shoulder thereon, a latch engaging said shoulder to prevent the rotation of said shaft and said motor, a releaser for said latch, a general operator arranged to actuate said releaser, and a latch for preventing the actuation of said releaser by said general operator.

67. In a computing machine having a carriage, the combination of a subtraction-setting mechanism, a motor for actuating said subtraction-setting mechanism, a shaft connected to said motor, a disk connected to said shaft having a locking shoulder thereon, a latch engaging said shoulder to prevent the rotation of said shaft and said motor, a releaser for said latch, a general operator arranged to actuate said releaser, a latch for preventing the actuation of said releaser by said general operator, and a carriage controlled trip for said last-mentioned latch.

68. In a computing machine capable of performing subtraction, the combination with a traveling carriage, of a subtraction-setting mechanism, a motor for said subtraction-setting mechanism, a shaft for said motor, a disk having a locking notch therein and secured to said shaft, a latch engaging said notch, a releaser for said latch, a general operator arranged to actuate said releaser, a latch for said releaser, a trip for said last-mentioned latch, and one or more tappets carried by said carriage for actuating said trip.

69. In a computing machine, the combination with a subtraction-setting mechanism, of a motor for actuating said subtraction-setting mechanism, a shaft for said motor, means for preventing the rotation of said shaft, and a stop for limiting the rotation of said shaft.

70. In a computing machine, the combination with a subtraction-setting mechanism, of a shaft for actuating said subtraction-setting mechanism, a disk on said shaft, a latch engaging said disk to prevent the actuation of said shaft, a releaser for said latch, and a member for actuating said releaser, said disk being formed to govern the relative position of said releaser with respect to said member after said releaser has moved said latch to release said disk and said shaft.

71. In a computing machine, the combination with a subtraction-setting mechanism, of a shaft for actuating said subtraction-setting mechanism, a latch preventing the rotation of said shaft, a releaser for said latch, and a disk on said shaft coöperating with said latch to prevent the rotation of said shaft, said disk having a shoulder engageable with said latch and a cam surface extending from said shoulder to move said latch farthest from the center of said shaft after having released said disk and said shaft.

72. In a computing machine, the combination with a subtraction-setting mechanism, of a shaft for operating said subtraction-setting mechanism, a latch for preventing the rotation of said shaft, a releaser for said latch, a latch for said releaser, and a disk coöperating with said first-mentioned latch to prevent the rotation of said shaft, said disk having a shoulder engaging said first-mentioned latch, with a cam extending from said shoulder to vary the position of said releaser relatively to said second-mentioned latch during a rotation of said shaft.

73. In a computing machine, the combination with a subtraction-setting mechanism, of a shaft rotating to actuate said subtraction-setting mechanism, a disk on said shaft, a latch engaging said disk to prevent the rotation of said shaft, a releaser for said latch, a member for operating said releaser, a second latch for preventing the actuation of said releaser by said member, and a trip for said second-mentioned latch, said disk having a dip to form a locking shoulder to engage said first-mentioned latch, with a cam surface extending upwardly from said shoulder to re-adjust the position of said releaser with respect to said second-mentioned latch after the same has been tripped to permit the actuation of said releaser by said member, so that said second-mentioned latch can re-engage said releaser.

74. In a computing machine, the combination with a subtraction-setting mechanism, of a shaft rotating to actuate said subtraction-setting mechanism, a disk on said shaft, a latch engaging said disk to prevent the rotation of said shaft, a releaser for said latch, a member for operating said releaser, a second latch for preventing the actuation of said releaser by said member, a trip for said second-mentioned latch, said disk having a dip to form a locking shoulder to engage said first-mentioned latch, with a cam surface extending upwardly from said shoulder to readjust the position of said releaser with respect to said second-mentioned latch after the same has been tripped to permit the actuation of said releaser by said member so that said second-mentioned latch can reëngage said releaser, and means for shifting said releaser after said second-mentioned latch has reëngaged the same to vary their relative positions.

75. In a computing machine, the combination with a subtraction-setting mechanism, of a shaft rotating to actuate said subtraction-setting mechanism, a disk on said shaft, a latch engaging said disk to prevent the rotation of said shaft, a releaser for said latch, a member for operating said releaser, a second latch for preventing the actuation of said releaser by said member, a trip for said second-mentioned latch, said disk having a dip to form a locking shoulder to engage said first-mentioned latch, with a cam surface extending upwardly from said shoulder to re-adjust the position of said releaser with respect to said second-mentioned latch after the same has been tripped to permit the actuation of said releaser by said member so that said second-mentioned latch can reëngage said releaser, and a spring connected to said releaser for raising said releaser after said second-mentioned latch has reëngaged the same so as to enable the prevention of a proper reëngagement of said second-mentioned latch with said releaser when disengaged therefrom.

76. In a computing machine, the combination with a subtraction-setting mechanism, a shaft for actuating said subtraction-setting mechanism, a latch for preventing the rotation of said shaft, a disk on said shaft coöperating with said latch, a releaser for said latch, a member for actuating said releaser, a second latch for preventing the actuation of said releaser by said member, and a trip for said second-mentioned latch, said disk having a deep dip therein to form a shoulder to engage said first-mentioned latch to prevent the rotation of said shaft and having a shallow dip therein to permit a re-adjustment of said releaser with respect to said second-mentioned latch after a rotation of said shaft.

77. In a computing machine, the combination with a subtraction-setting mechanism, of a shaft for actuating said subtraction-setting mechanism, a latch for preventing the rotation of said shaft, a disk on said shaft coöperating with said latch, a releaser for said latch, a member for operating said releaser, a second latch for preventing the actuation of said releaser by said member, and a trip in said second latch, said disk having a deep dip therein to form a shoulder coöperating with said first-mentioned latch, with a cam surface extending from said shoulder to vary the position of said releaser with respect to said second-mentioned latch, said disk also having a shallow dip therein to accommodate a re-adjustment of the position of said releaser with respect to said second-mentioned latch.

78. In a computing machine, the combination with a subtraction-setting mechanism, of a shaft for actuating said subtraction-setting mechanism, a disk on said shaft, a latch engaging said disk to prevent the rotation of said shaft, a releaser for said latch, a member for actuating said releaser, a second latch preventing the actuation of said releaser by said member, and a trip for said second-mentioned latch, said disk being formed to vary the position of said releaser with respect to said second-mentioned latch after the tripping of said second-mentioned latch and before and after the reëngagement of said second-mentioned latch with said releaser.

79. In a computing machine, the combination with a subtraction-setting mechanism, of a shaft for actuating said subtraction-setting mechanism, a disk on said shaft, a latch engaging said disk to prevent the rotation of said shaft, a releaser for said latch, a member for actuating said releaser, a second latch preventing the actuation of said releaser by said member, a trip for said second-mentioned latch, said disk being formed to vary the position of said releaser with respect to said second-mentioned latch after the tripping of said second-mentioned latch and before and after the reëngagement of said second-mentioned latch with said releaser, and a spring coöperating with said disk and said member to effect the various manipulations of said releaser.

80. The combination with a computing mechanism, of mechanism for varying the character of computation of said computing mechanism, a motor for actuating said second-mentioned mechanism, a general operator for said computing mechanism, gearing to said general operator, and a clutch connection between said gearing and said motor effective solely to enable said general operator to reënergize said motor when said motor needs reënergizing.

81. The combination with a computing mechanism of means for changing the character of action of said mechanism, a shaft for actuating said means, a motor for rotating said shaft, a general operator for said computing mechanism, a train of gearing for said general operator, a clutch connection between said gearing and said shaft, said clutch connection being effective solely after said motor has rotated said shaft, and stops for determining the effective position of said clutch connection by limiting the movement of said shaft to a position such that the parts of said clutch engage to form a positive driving connection between said general operator and said motor, so as to enable the reënergizing of said motor by said general operator.

82. In a computing machine capable of performing subtraction, a subtraction rod for setting up a subtracting condition, a motor, a shaft for said motor, a cam on said shaft having an abrupt dip therein, an arm on said subtraction rod having a following roller engaging said cam, and a spring for permitting a yielding movement of said arm to enable a counter-rotation of said shaft and said cam.

83. In a computing machine capable of performing both addition and subtraction, a rod for effecting a change in the character of computation, an arm pivotally connected to said rod, a spring for yieldingly holding said arm in a fixed position, a cam engaging said arm, a shaft for rotating said cam in one direction, and means for rotating said shaft in the opposite direction, said spring yielding to admit of a giving movement of said arm during said counter-rotation.

84. In a computing machine capable of performing both addition and subtraction, a rod for effecting a change in the character of computation, an arm pivotally mounted on said rod, a stop for limiting the movement of said arm in one direction, a spring for permitting a yielding movement of said arm in the opposite direction, a follower on said arm, a cam engaging said follower to actuate said rod, a shaft for rotating said cam, and means for rotating said shaft in opposite directions, said arm yielding during a rotation in one direction.

85. In a computing machine capable of performing both addition and subtraction, a rod for effecting a change in the character of computing action, a cam having an abrupt dip therein for actuating said rod, a follower on said rod engaging said cam, a shaft for rotating said cam, a fixed stop, a stop on said shaft stopping the movement of said shaft corresponding to the apposition of said follower to the abrupt dip in said cam, and a dog for engaging said rod to hold it in its actuated position.

86. In a computing machine capable of performing subtraction, a subtraction-setting mechanism, a driving motor, a traveling carriage, a trip for controlling the drive by said motor, a trip for controlling the setting to subtraction of said mechanism, and a tappet carried by said carriage for actuating both of said trips.

87. The combination with a computing mechanism, of a traveling carriage, a subtraction-setting mechanism for said computing mechanism, a general operator for said computing mechanism, means controlled by said general operator during a movement thereof to actuate said subtraction-setting mechanism, a motor for driving said general operator, a trip for controlling the drive of said motor by said general operator, a trip for controlling the effectiveness of said subtraction-setting mechanism, and means for actuating said trip during the traveling movement of said carriage, said trip which controls the subtraction-setting mechanism being set slightly in advance of said trip which controls the drive of said general operator by said motor, so that said subtraction-setting mechanism will be in a condition to be actuated by said general operator when said motor drives said general operator.

88. The combination with a computing mechanism, of a state-changing mechanism for determining the character of computation of said computing mechanism, a motor for driving said computing mechanism, a traveling carriage, a trip for controlling said state-changing mechanism, a trip for controlling the drive of said computing mechanism by said motor, and a plurality of tappets carried by said carriage for operating said trips, said tappets being of different effective reaches to determine which of said trips they shall actuate.

89. The combination with a traveling carriage, of a computing mechanism, a state-controlling mechanism for determining the character of computation carried on by said computing mechanism, a motor for driving said computing mechanism, a trip for controlling said state-controlling mechanism, a trip for controlling the drive of said computing mechanism by said motor, a short tappet on said carriage for actuating one of said trips and a long tappet on said carriage for actuating the other of said trips, said trips being located one in rear of the other so that one can be operated independently of the other.

90. The combination with a computing mechanism, of state-controlling means for governing the character of computation carried on by said computing mechanism, a general operator for said computing mechanism, a motor for actuating said state-controlling means, and means actuated by said general operator while coming to rest after a movement for enabling the actuation of said state-controlling means by said motor.

91. The combination with a computing wheel, of a rack bar for rotating said computing wheel, a series of pins settable on said rack bar to determine the extent of movement thereof, a supernumerary bar, a lug on said supernumerary bar arranged to engage a set pin on said rack bar, and a general operator having a cross bar arranged to drive said supernumerary bar.

92. The combination with a plurality of computing wheels ranging from lowest to highest denomination, of a series of rack bars arranged to rotate said computing wheels, a series of pins on each of said rack bars settable to determine the extent of movement of the accordant bars, a supernumerary bar, a general operator having a cross bar arranged to engage the set pins on the several rack bars to rotate the computing wheels amounts corresponding to said set pins, and an extension or lug on said supernumerary bar movable at times in a line with the front edge of said cross bar and at other times one step to one side of the front edge of said cross bar, said extension engaging the set pin on one of said bars so as to give a discordant movement of said bar with respect to a corresponding pin set on others of said bars when said extension is offset to one side of the front edge of said cross bar.

93. The combination with a series of computing wheels ranging from high to low denomination, of a series of rack bars for driving said computing wheels, a series of pins settable on each of said rack bars to determine the extent of movement thereof, a general operator having a cross bar adapted to engage at its front edge with the set pins on said rack bars, and an extension arranged to engage the set pin on one of said rack bars, said extension being adjustable from a position with its front edge in line with the front edge of said cross bar to a position with its front edge one step in advance of the front edge of said cross bar, so as to give to the accordant rack bar a movement one step in excess of that determined by the particular pin set up thereon.

94. The combination with a series of computing wheels ranging from highest to lowest denomination, of a series of rack bars for rotating said computing wheels, a series of pins settable on each of said rack bars to determine the extent of rotation of said computing wheels, a general operator having a cross bar arranged to engage at its front edge with the set pins to actuate said rack bars, and an extension for engaging with the set pins on the rack bar corresponding to the computing wheel of lowest denomination, said extension being adjustable from a position with its front edge in alinement with the front edge of said cross bar to a position with its front edge one step in advance of the front edge of said cross bar, so as to give a movement to said computing wheel of lowest denomination one step in excess of that determined by the particular pin set on the associated rack bar.

95. The combination with a series of computing wheels ranging from high to low denomination, of a series of rack bars for rotating said computing wheels, a series of pins settable on each of said rack bars to determine the movement thereof, a cross bar engaging at its front edge with said set pins to actuate said rack bars, a supernumerary bar, an extension on said supernumerary bar arranged to engage the set pins on the rack bar corresponding to the computing wheel of lowest denomination, and means for determining whether said extension shall travel with its front edge in alinement with the front edge of said cross bar or with its front edge one step offset from the front edge of said cross bar.

96. The combination with a series of computing wheels, of a series of rack bars for rotating said computing wheels, a series of pins settable on each of said rack bars to determine the extent of movement thereof, a cross bar in engagement with said set pins to actuate said rack bars, a supernumerary bar having an extension arranged to engage the set pins on one of said rack bars, and a trigger on said supernumerary bar movable to a position in the path of said cross bar, so as to give said supernumerary bar a movement somewhat in advance of any of the rack bars.

97. The combination with a series of computing wheels ranging from high to low denomination, of a series of rack bars for rotating said computing wheels, a series of pins settable on each of said rack bars for determining the movement thereof, a general operator having a cross bar arranged to engage the set pins on said rack bars to actuate the same, said general-operator cross bar having a cut-out portion at its front edge, and means for determining whether said cut-out portion shall have its front edge located in alinement with the front edge of said cross bar or in advance of the front edge of said cross bar during a movement of said cross bar, said cut-out portion coöperating with the set pins on one of said rack bars to actuate the same.

98. The combination with a bar, of a general operator having an edge extending transversely of said bar, an extension mounted on said bar, and a trigger for determining whether said extension shall have one of its edges in alinement with said transverse edge or offset relatively to said transverse edge.

99. The combination with a bar, of a general operator having an edge transverse to said bar, an extension on said bar, and a trigger movable into and out of the path of said general operator to determine the relative position of one of the edges of said extension with respect to said transverse edge of said general operator.

100. The combination with a bar, of a general operator, a trigger pivotally mounted on said bar for determining the extent of movement of said bar with said general operator, and a ball-and-a-socket lock for holding said trigger in any of its adjusted positions.

101. The combination with a series of computing wheels, of a series of rack bars for rotating said computing wheels, a series of pins settable on each of said rack bars to determine the extent of movement thereof, a supernumerary bar, an extension on said supernumerary bar for engaging the set pins on one of said rack bars, a general operator for engaging the set pins on the others of said rack bars for actuating the same, a trigger on said supernumerary bar for determining the extent of movement of said extension with said general operator, and means for concomitantly setting a row of pins on said rack bars and said trigger on said supernumerary bar.

102. The combination with a computing mechanism, of state-controlling means for varying the type of computation carried on by said computing mechanism, a traveling carriage, a motor for driving said computing mechanism, and a single tappet carried by said carriage, arranged to concomitantly adjust said state-controlling means and bring said motor into play to drive said computing mechanism.

103. The combination with a computing mechanism, of state-controlling mechanism for said computing mechanism, a motor for driving said computing mechanism, normally disconnected therefrom, an intermittent clutch for connecting said motor in driving relation with said computing mechanism, connections for tripping said clutch, connections for tripping said state-controlling mechanism, a carriage traveling to determine different computing zones, and a single tappet carried by said carriage, arranged to actuate both of said connections to concomitantly change the state of computation to be carried on by said computing mechanism, and bring said motor into driving relation with said computing mechanism to run up a computation therein.

104. The combination with a gang-driven computing mechanism, including numeral keys, means to enable said keys to set up the digits of a number, and a general operator having means to compute the number after the digits are set up by the keys for the entire number, of a carriage traveling to determine different computing zones, tabulating mechanism for said carriage, a motor for driving said general operator, normally ineffective to accomplish such driving action, and automatic means operative once in each zone from a part of said tabulating mechanism for enabling said motor to drive said general operator.

105. The combination with a gang-driven computing mechanism, including numeral keys, means to enable said keys to set up the digits of a number, and a general operator having means to compute the number after the digits are set up by the keys for the entire number, of a carriage traveling to determine computing zones of said computing mechanism, tabulating mechanism for said carriage, a motor for driving said general operator, normally disconnected therefrom, an intermittent clutch for connecting said general operator in driven relation with said motor, and automatically operated connections actuated from a part of said tabulating mechanism to trip said clutch once in each zone to enable the driving of said general operator by said motor.

106. The combination with a computing mechanism, of state-controlling mechanism for varying the character of computation of said computing mechanism, a carriage traveling to determine different computing zones of said computing mechanism, a motor for driving said computing mechanism, normally incapable of effecting such driving action, connections for enabling the driving of said computing mechanism by said motor for adjusting said state-controlling mechanism to vary the character of computation carried on by said computing mechanism, tabulating keys, plungers operated by said tabulating keys, and a stop carried by said carriage acting to be engaged by one of said plungers to determine the position of said carriage after tabulating, and acting to operate both of said connections automatically at a certain point in the travel of said carriage, so as to effect a change in the character of computation carried on by said computing mechanism, and enable said motor to run up a computation in said computing mechanism.

107. The combination with a computing mechanism, of a trip for controlling said computing mechanism and comprising a pair of spaced plates, a pawl pivotally mounted between said plates and having an angular corner, and a V-spring engaging said angular corner to permit a movement of said pawl in opposite directions, and tending to return said pawl to a normal intermediate position.

108. The combination with a computing mechanism, of a trip for controlling said computing mechanism and comprising a pair of spaced plates, a pawl pivotally mounted between said plates, and having a major movement in one direction and a minor movement in the opposite direction, and a spring for returning said pawl to a normal intermediate position.

109. The combination with a computing mechanism, of a trip for controlling said computing mechanism and comprising a pair of spaced plates, a pawl pivotally mounted between said plates and having an angular corner, a V-spring engaging said angular corner to permit a movement of said pawl in opposite directions, and an adjustable stop variably limiting the movement of said pawl in one direction.

110. The combination with a series of computing wheels, of a gang drive for said computing wheels having driving members individual to each computing wheel, and a driving member below the driving member for the computing wheel of lowest denomination, acting to drive said computing wheel of lowest denomination an extra step through the intermediary of the driving member therefor, by overlapping and engaging such driving member.

111. The combination with a series of computing wheels, of a gang drive for said computing wheels, including a series of driving members to correspond with the series of computing wheels, and a supernumerary driving member below the driving member for the computing wheel of lowest denomination, acting to drive the computing wheel of lowest denomination an extra step by driving the driving member for the computing wheel of lowest denomination an extra step.

112. The combination with a series of computing wheels, of driving members individual to several computing wheels, complementary subtraction mechanism enabling the drive of said driving members complementary amounts to effect a subtraction rotation of said computing wheels, and automatic means operated by said complementary subtraction mechanism for driving the driving member for the computing wheel of lowest denomination an extra step, so as to enable the computing wheel of lowest denomination to be advanced an extra step.

113. The combination with a series of computing wheels, of driving mechanism for said computing wheels, numeral keys for controlling the extent of movement of said driving mechanism, subtraction-setting mechanism for enabling driving movements of said driving mechanism corresponding to the codigital or complementary values of the numeral keys actuated, and automatic means operated from said subtraction-setting mechanism for causing said driving mechanism to move an extra step so as to drive the computing wheel of lowest denomination an extra step over that determined by the complementary value of the numeral key actuated for the computing wheel of lowest denomination.

114. In a computing machine, the combination with an operator, of a source of power for actuating said operator, a train of gearing between said source of power and said operator including a clutch, a pin controlling the effectiveness of said clutch, a lever for operating said pin, a thrust link on said lever and having a lug projecting from one side thereof, a lever engaging said lug, a latch for said second-mentioned lever, and means for releasing said latch.

115. The combination with a computing mechanism, of a motor for driving said computing mechanism, a subtraction-setting mechanism for said computing mechanism, a traveling carriage, a train of connections for bringing said subtraction-setting mechanism into play, a train of connections for bringing said motor into play so as to drive said computing mechanism, and a traveling tappet having a range to overlap both trains of connections to actuate them simultaneously.

116. The combination with a register and means to actuate the same, of means for changing the condition of the actuating means to cause either addition or subtraction to be performed, a member to operate or control the condition-changing means, a spring tending to actively drive said member, a carriage, means releasable by said carriage for restraining said member, and a general operator having means to positively restore said member after actuation.

117. The combination with a register and actuating means therefor, of means for changing the condition of the actuating means to cause either addition or subtraction to be performed, a member to control the condition-changing means, a spring tending to actively drive said member, a carriage, a latch for restraining said member normally engaged therewith but releasable by said carriage, and a general operator having means to restore said member after actuation.

118. The combination with a register and actuating means therefor, of means for changing the condition of the actuating means to cause either addition or subtraction to be performed, a member to control the condition-changing means, a spring tending to actively drive said member, a latch to restrain the said member, a lever operatively connected to said latch, a carriage, carriage-controlled means for rocking said lever to release said latch, and a general operator having means to positively restore said member after actuation.

119. The combination with a register and actuating means therefor, of means for changing the condition of the actuating means to cause either addition or subtraction to be performed, a member to control the condition-changing means, a spring tending to actively drive said member, a latch to restrain said member, a lever operatively connected to said latch and provided with a cam, a carriage, carriage-controlled means engageable with said cam for rocking said lever to release said latch, and a general operator having means to positively restore said member after actuation.

120. The combination with a computing head and means to actuate the same; of means for changing the condition of the actuating means to cause either addition or subtraction to be performed; a member to operate or control the condition changing means; a spring tending to actively drive said member; a carriage; and means releasable by said carriage for restraining said member.

121. The combination with a computing head and means to actuate the same; of means for changing the condition of the actuating means to cause either addition or subtraction to be performed; a member to operate or control the condition-changing means; a spring tending to actively drive said member; a carriage; and a latch releasable by said carriage for restraining said member.

122. The combination with a computing head and actuating means therefor; of means for changing the condition of the actuating means to cause either addition or subtraction to be performed; a member to control the condition changing means; a spring tending to actively drive said member; means to restrain said member; a lever operatively connected to said restraining means and provided with a cam; a carriage; and carriage-controlled means engageable with said cam for rocking said lever to release said restraining means.

123. The combination with a computing head and actuating means therefor; of means for changing the condition of the actuating means to cause either addition or subtraction to be performed; a member to control the condition changing means; a spring tending to actively drive said member; means to restrain said member; a lever operatively connected to said restraining means and provided with a cam; a carriage; and a member on said carriage arranged to engage said cam so as to rock said lever and thereby release said restraining means.

JOHN N. THORNTON.

Witnesses.
TITUS H. IRONS,
F. E. ALEXANDER.

Copies of this patent may be obtained for five cents each, by addressing the "Commissioner of Patents, Washington, D. C."